(12) United States Patent
Tokuda et al.

(10) Patent No.: US 11,505,214 B2
(45) Date of Patent: Nov. 22, 2022

(54) DRIVING OPERATION HANDOVER SYSTEM AND VEHICLE

(71) Applicant: TOYOTA JIDOSHA KABUSHIKI KAISHA, Toyota (JP)

(72) Inventors: Yosuke Tokuda, Toyota (JP); Masahiro Nishio, Toyota (JP); Shuichiro Takahashi, Toyota (JP); Haruka Yano, Toyota (JP); Taichi Amakasu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 16/916,214

(22) Filed: Jun. 30, 2020

(65) Prior Publication Data

US 2021/0039672 A1 Feb. 11, 2021

(30) Foreign Application Priority Data

Aug. 6, 2019 (JP) .............................. JP2019-144838

(51) Int. Cl.
*B60W 60/00* (2020.01)
*B60W 50/14* (2020.01)
(Continued)

(52) U.S. Cl.
CPC .......... *B60W 60/005* (2020.02); *B60W 40/12* (2013.01); *B60W 50/14* (2013.01); *G05D 1/0011* (2013.01)

(58) Field of Classification Search
None
See application file for complete search history.

(56) References Cited

U.S. PATENT DOCUMENTS

2015/0346724 A1* 12/2015 Jones ................... B62D 15/025
701/23
2017/0212512 A1 7/2017 Schmid
(Continued)

FOREIGN PATENT DOCUMENTS

JP H03-282713 A 12/1991
JP 2003-205762 A 7/2003
(Continued)

*Primary Examiner* — James J Lee
*Assistant Examiner* — Tawri M Matsushige
(74) *Attorney, Agent, or Firm* — Oliff PLC

(57) ABSTRACT

A driving operation handover system includes a memory and a processor, wherein the processor is configured to: acquire a first characteristic value of preset setting characteristics during travel of a vehicle equipped with a manual operation unit that an occupant operates; acquire a second characteristic value of the preset setting characteristics during travel of a virtual vehicle that simulates the vehicle, which a remote operator operates using a remote operation unit; calculate a difference value between the first characteristic value and the second characteristic value; in a case in which the difference value is lower than a setting threshold value, notify the occupant and the remote operator that operation of the vehicle can be handed over; and after notification, switch operation of the vehicle from one of the remote operator or the occupant to another of the remote operator or the occupant.

19 Claims, 13 Drawing Sheets

(51) Int. Cl.
*B60W 40/12* (2012.01)
*G05D 1/00* (2006.01)

(56) References Cited

U.S. PATENT DOCUMENTS

| | | | |
|---|---|---|---|
| 2017/0308075 A1* | 10/2017 | Whitaker | B60W 30/18 |
| 2019/0212732 A1* | 7/2019 | Takanashi | G05D 1/0027 |
| 2019/0265710 A1* | 8/2019 | Kaneko | B60W 40/08 |
| 2019/0286127 A1* | 9/2019 | Watanabe | B62D 6/008 |
| 2019/0294160 A1* | 9/2019 | Shintani | G01C 21/3407 |
| 2019/0302756 A1* | 10/2019 | Mori | B60W 50/14 |
| 2019/0339696 A1* | 11/2019 | Mori | G05D 1/0038 |
| 2020/0047773 A1* | 2/2020 | Akaba | G08G 1/16 |
| 2020/0057436 A1* | 2/2020 | Boda | H04Q 9/00 |

FOREIGN PATENT DOCUMENTS

| | | |
|---|---|---|
| JP | 2016-091412 A | 5/2016 |
| JP | 2017-522668 A | 8/2017 |
| JP | 2018-181120 A | 11/2018 |
| JP | 2019-194050 A | 11/2019 |
| WO | 2018/087880 A1 | 5/2018 |

* cited by examiner

DRIVING OPERATION HANDOVER SYSTEM AND VEHICLE

CROSS-REFERENCE TO RELATED APPLICATION

This application is based on and claims priority under 35 USC 119 from Japanese Patent Application No. 2019-144838 filed on Aug. 6, 2019, the disclosure of which is incorporated by reference herein.

BACKGROUND

Technical Field

The present disclosure relates to a driving operation handover system and a vehicle.

Related Art

For example, Japanese Patent Application Laid-Open No. 2018-181120 discloses a driving support device that evacuates a vehicle to an evacuation place when switching from automatic driving to manual driving cannot be performed, that is, when the driving operation cannot be taken over.

By the way, in the configuration in which the vehicle is stopped at the evacuation place when the driving operation is taken over as in the technology disclosed in Japanese Patent Application Laid-Open No. 2018-181120, the time required for taking over the driving operation is increased by the stopping time, and there is room for improvement.

SUMMARY

The present disclosure provides a driving operation handover system and a vehicle which can hand over a driving operation between an occupant and a remote operator without stopping the vehicle.

A driving operation handover system according to a first aspect of the present disclosure includes: a first acquisition unit that acquires a first characteristic value of preset setting characteristics during travel of a vehicle equipped with a manual operation unit that an occupant operates; a second acquisition unit that acquires a second characteristic value of the preset setting characteristics during travel of a virtual vehicle that simulates the vehicle, which a remote operator operates using a remote operation unit; a calculation unit that calculates a difference value between the first characteristic value and the second characteristic value; a notification unit that, in a case in which the difference value calculated by the calculation unit is lower than a setting threshold value, notifies the occupant and the remote operator that operation of the vehicle can be handed over; and a switching unit that, after notification by the notification unit, switches operation of the vehicle from one of the remote operator or the occupant to another of the remote operator or the occupant.

In the driving operation handover system according to the first aspect of the present disclosure, in a case in which the difference value between the first characteristic value and the second characteristic value acquired by the calculation unit is lower than the setting threshold value, the notification unit notifies the occupant and the remote operator that operation of the vehicle can be handed over. Then, after the notification by the notification unit, the switching unit switches operation of the vehicle from one of the occupant or the remote operator to another of the occupant or the remote operator. As described above, in a case in which the difference value between the first characteristic value and the second characteristic value is lower than the setting threshold value, that is, in a case in which an operation state of the vehicle by the occupant and an operation state of the virtual vehicle by the remote operator are in a close state, operation of the vehicle from one of the occupant or the remote operator is switched to another of the occupant or the remote operator. As a result, since the operation can be switched while the vehicle is traveling, driving operation handover can be performed between the occupant and the remote operator without stopping the vehicle.

In the driving operation handover system according to a second aspect of the present disclosure, in the first aspect, the first characteristic value is an operation amount of the manual operation unit operated by the occupant, and the second characteristic value is an operation amount of the remote operation unit operated by the remote operator.

In the driving operation handover system according to the second aspect of the present disclosure, the operation amount of the manual operation unit is the first characteristic value, and the operation amount of the remote operation unit is the second characteristic value. Here, since the operation amount of each operation unit is easier to detect compared to a case of detecting a state amount of the vehicle, it is possible to easily acquire the difference value.

In the driving operation handover system according to a third aspect of the present disclosure, in the first aspect, a detection unit that detects a characteristic value of a travel state of the vehicle, as a detection value, is provided at the vehicle; a conversion unit, which converts an operation amount of the remote operation unit operated by the remote operator to a virtual value indicating a travel state of the virtual vehicle, is provided at the remote operation unit; the first characteristic value is the detection value that is detected at the detection unit; and the second characteristic value is the virtual value that is converted at the conversion unit.

In the driving operation handover system according to the third aspect of the present disclosure, a difference value of a vehicle state is used for comparison with the setting threshold value instead of the operation amount of each operation unit. As a result thereof, since an error when converting the operation amount of the manual operation unit into the characteristic value of the vehicle state is not included, an error included in the difference value can be reduced compared with the configuration using the operation amount.

In the driving operation handover system according to a fourth aspect of the present disclosure, in any one of the first aspect to the third aspect, an identification unit that identifies whether a section of travel of the vehicle is a switchable section or a non-switchable section, by the switching section, is provided; and in a case in which the section of travel is identified by the identification section as the non-switchable section, the switching section does not execute switching the operation even if the difference value is lower than the setting threshold value.

In the driving operation handover system according to the fourth aspect of the present disclosure, in a case in which the section of travel is identified by the identification section as the non-switchable section, the switching section does not execute switching the operation even if the difference value is lower than the setting threshold value. As a result, since switching the operation is not performed by the switching unit in the non-switchable section where caution is required for driving operation, such as a corner, a hill, or a narrow road, the occurrence of a driving operation mistake in a non-switchable section can be prevented.

In the driving operation handover system according to a fifth aspect of the present disclosure, in any one of the first aspect to the fourth aspect, the switching unit does not execute switching the operation in a case in which the difference value does not become lower than the setting threshold value within a set time period, and the notification unit notifies that the switching unit does not switch the operation.

In the drive operation handover system according to the fifth aspect of the present disclosure, the switching unit does not execute switching the operation in a case in which the difference value does not become lower than the setting threshold value within a set time period. Further, the notification unit notifies that switching the operation is stopped. As a result, since the need for the occupant and the remote operator to continue waiting without knowing whether or not the operation can be switched is eliminated, the occurrence of dissatisfaction in the occupant and the remote operator is able to be suppressed.

In the driving operation takeover system according to a sixth aspect of the present disclosure, in the fifth aspect, plural remote operation units are provided, and in a case in which the difference value does not become lower than the setting threshold value within the set time period, the notification unit issues a recommendation to the occupant to change to another remote operation unit.

In the driving operation takeover system according to the sixth aspect of the present disclosure, in a case in which the difference value does not become lower than the setting threshold value within the set time period, the notification unit issues a recommendation to the occupant to change to another remote operation unit. As a result, since the need for the occupant to continue waiting without knowing whether or not the operation can be switched is eliminated, the occurrence of dissatisfaction in the occupant is able to be suppressed.

In the driving operation handover system according to a seventh aspect of the present disclosure, in any one of the first aspect to the sixth aspect, a load application unit, which applies a load to the operation of whichever of the manual operation unit or the remote operation unit hands over the operation, is provided at the manual operation unit and the remote operation unit.

In the driving operation handover system according to the seventh aspect of the present disclosure, load is applied to the operation of whichever of the manual operation unit or the remote operation unit hands over the operation. As a result, since the occupant or the remote operator who handed over the operation can recognize that the operation has been handed over even if there is no display or the like, a state of handover of the operation can be made to be recognized without using a display or voice to provide notification of a state of handover.

A vehicle according to an eighth aspect of the present disclosure includes: a manual operation unit at which operation is performed by an occupant; a manual acquisition unit that is provided at the manual operation unit and that acquires a first characteristic value of preset setting characteristics during travel; and a notification unit that is provided at the manual operation unit and that, in a case in which a difference value between the first characteristic value and a second characteristic value of the preset setting characteristics, which is acquired during travel of a virtual vehicle that is operated by a remote operator at a remote operation unit, is lower than a setting threshold value, notifies the occupant that the operation can be handed over, wherein, after notification by the notification unit, the operation is switched by the switching unit from one of the remote operator or the occupant to another of the remote operator or the occupant.

In the vehicle according to the eighth aspect of the present disclosure, in a case in which the difference value between the first characteristic value and the second characteristic value is lower than the setting threshold value, the notification unit notifies the occupant that the operation of the vehicle can be handed over. Further, after notification by the notification unit, the operation of the vehicle is switched from one of the occupant or the remote operator to another of the occupant or the remote operator. In this manner, in a case in which the difference value between the first characteristic value and the second characteristic value is lower than the setting threshold value and an operation state of the vehicle by the occupant and an operation state of the virtual vehicle by the remote operator are in a close state, operation of the vehicle from one of the occupant or the remote operator is switched to another of the occupant or the remote operator. As a result, since the operation can be switched while the vehicle is traveling, driving operation handover can be performed between the occupant and the remote operator without stopping the vehicle.

As described above, according to the present disclosure, there is an excellent effect that the driving operation can be handed over between the occupant and the remote operator without stopping the vehicle.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
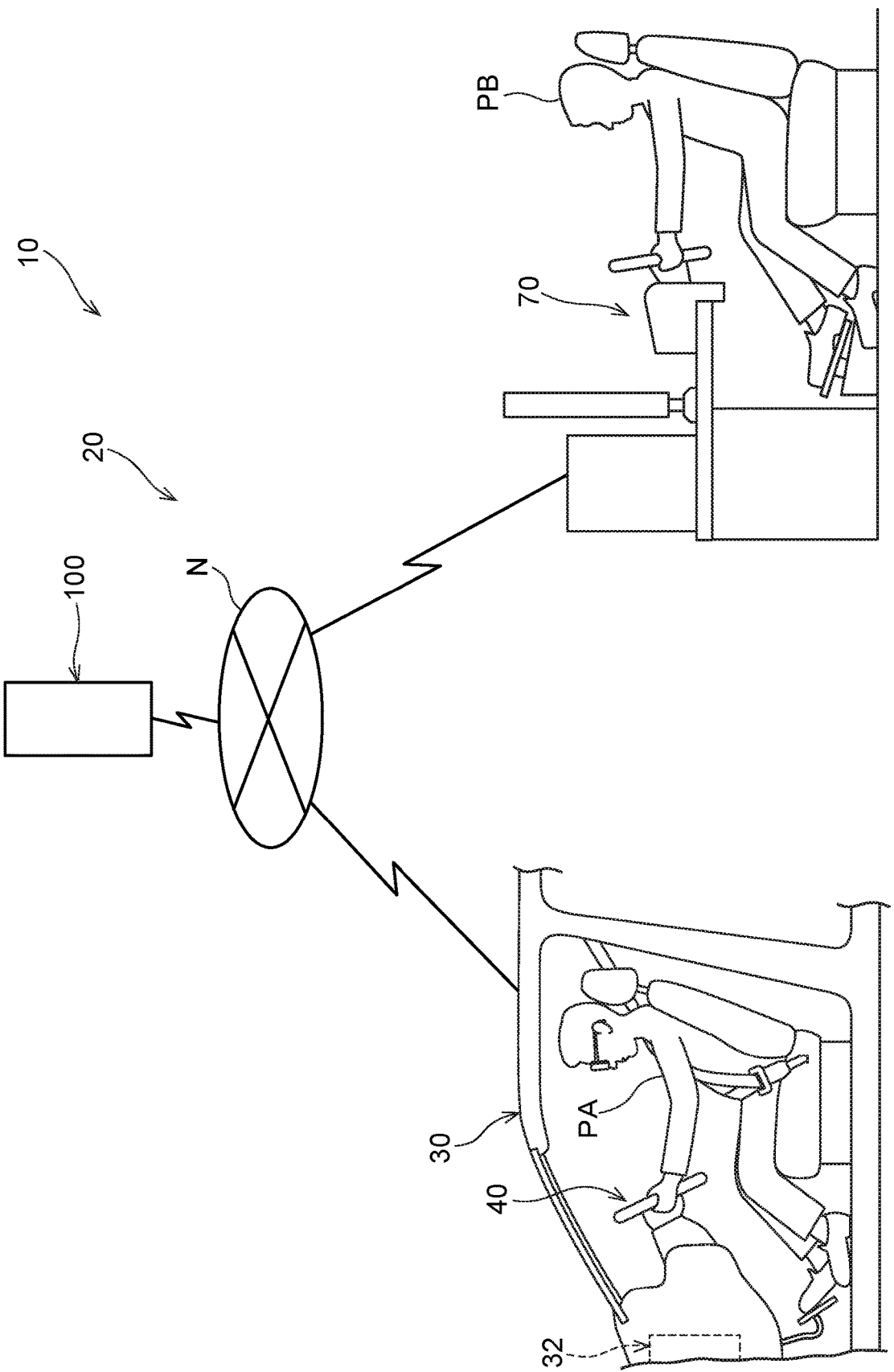
FIG. 1 is a diagram showing an outline of a remote operation system including a driving operation handover system according to a first embodiment.

FIG. 1 shows an outline of a remote operation system 10. The remote operation system 10 is configured to include a driving operation handover system 20 described later. The remote operation system 10 is configured to include, for example, a vehicle 30, a remote operation unit 70, a management unit 100, and another remote operation unit 200. See FIG. 5 for these. The vehicle 30, the remote operation unit 70, the management unit 100, and the other remote operation unit 200 are connected to each other by a predetermined network N as a communication unit so that bidirectional information transmission is possible.

Hardware Configuration

The hardware configuration of the vehicle 30, the remote operation unit 70, and the management unit 100 will be described.

Vehicle

The vehicle 30 is configured to include a vehicle driving device 32 and a manual operation unit 40. The vehicle driving device 32 includes an engine, a transmission, and the like (not shown), and drives the vehicle 30 based on a driving operation by the manual operation unit 40 or the remote operation unit 70. The manual operation unit 40 is operated by the occupant PA.

Figure 2:
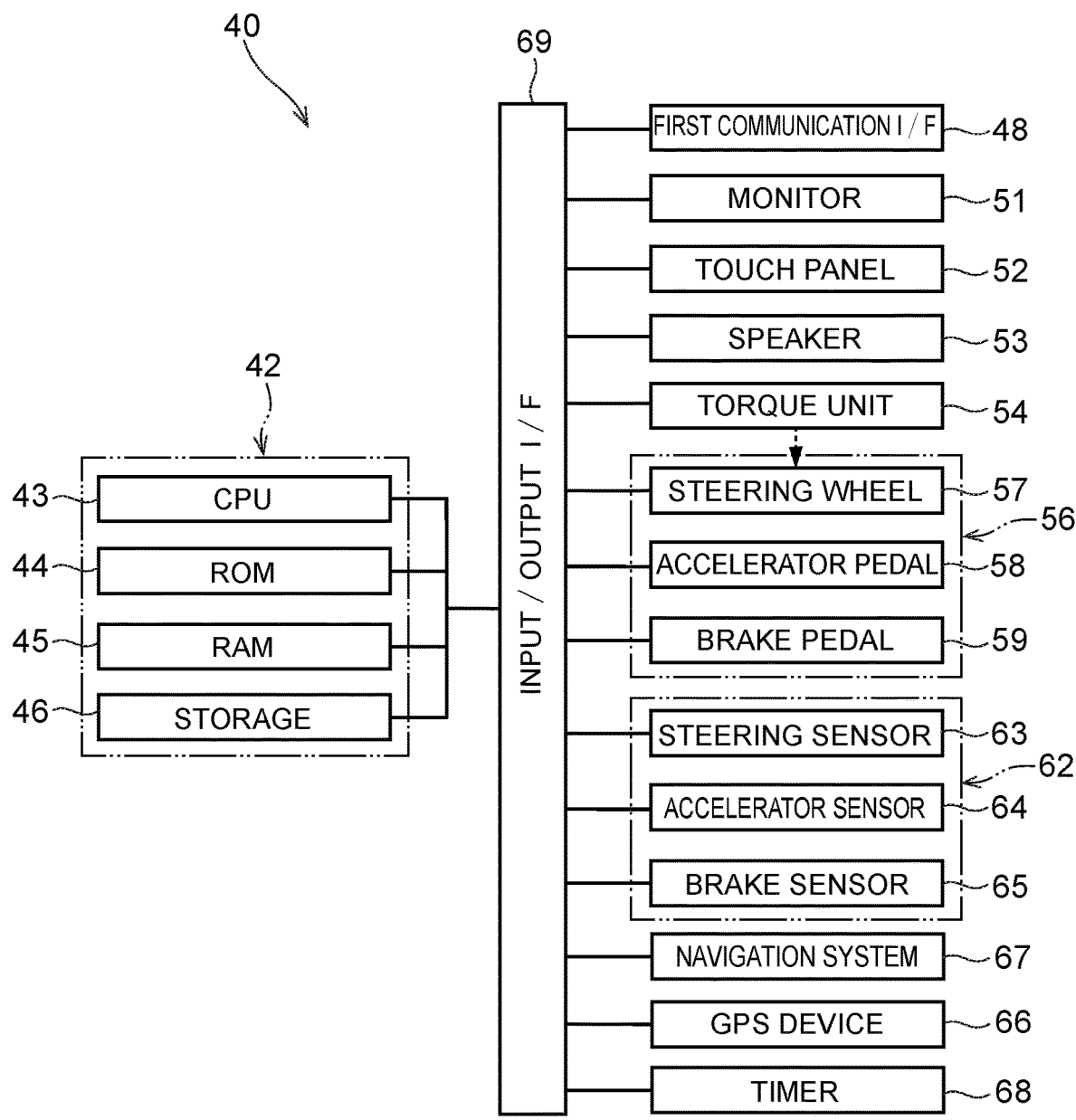
FIG. 2 is a block diagram showing a hardware configuration of a manual operation unit of the driving operation handover system according to the first embodiment.

FIG. 2 illustrates an example of a hardware configuration of the manual operation unit 40. The manual operation unit 40 has an ECU 42, a first communication interface 48, a monitor 51, a touch panel 52, a speaker 53, a torque unit 54, an operation unit 56, and a sensor unit 62. Further, the manual operation unit 40 has a navigation system 67, a GPS device 66, a timer 68, and an input/output interface 69. ECU means Electronic Control Unit. GPS is an abbreviation for Global Positioning System. I/F is an abbreviation for interface. The ECU 42 and each component are connected to each other via an input/output interface 69 so as to be able to communicate with each other.

The ECU 42 has a CPU as a processor, that is, a Central Processing Unit 43, a ROM, that is, a Read Only Memory 44, a RAM, that is, a Random Access Memory 45, and a storage 46.

The ROM 44 stores various types of programs and various types of data. The RAM 45 acts as a workspace for temporary storage of programs and data. As an example, the storage 46 is configured by flash ROM, that is, Read Only Memory, and holds various programs including an operating system, and various data. The CPU 43 executes various programs recorded in the ROM 44 as a memory or the storage 46 as a memory.

Figure 3:
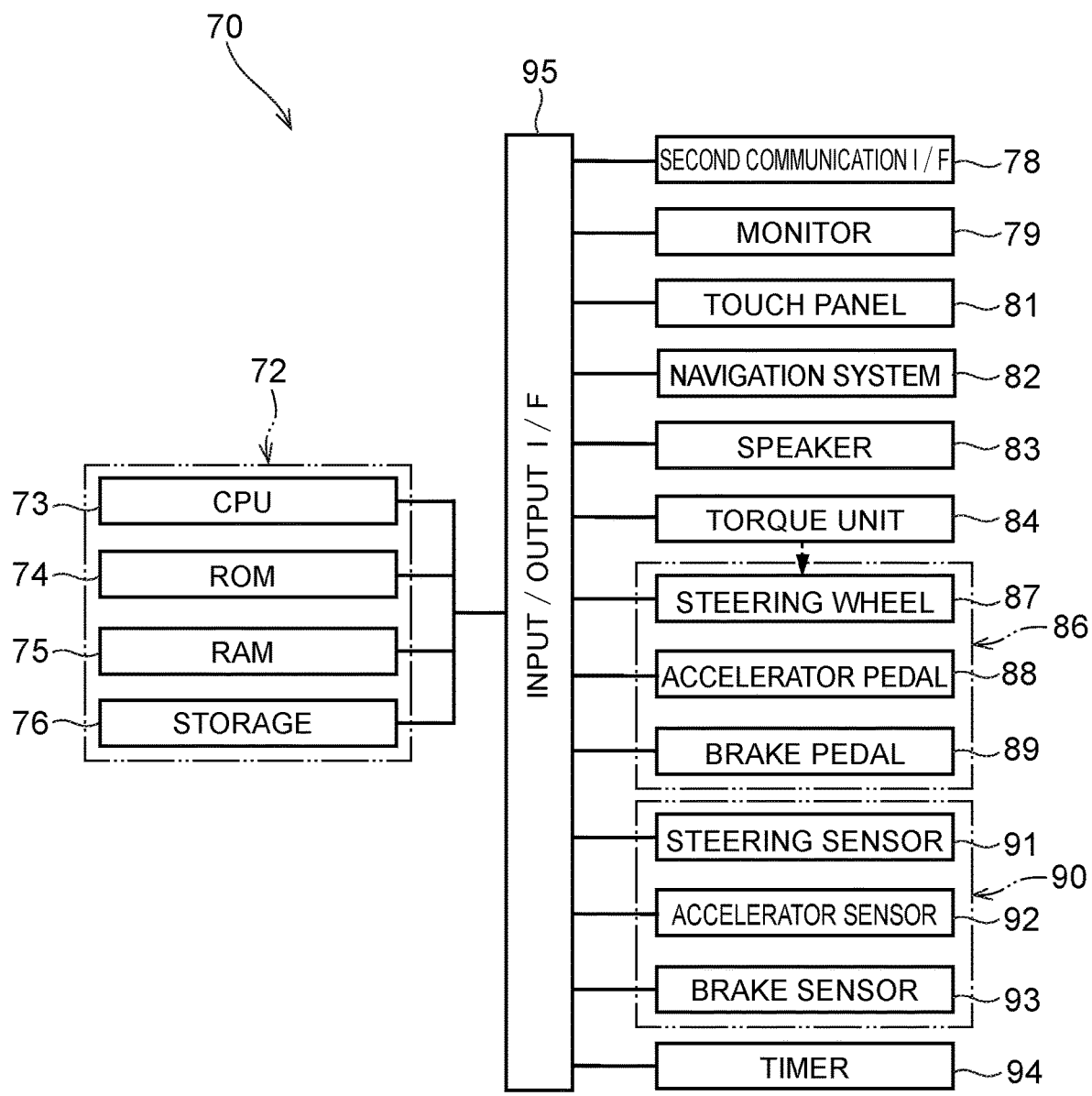
FIG. 3 is a block diagram illustrating a hardware configuration of a remote operation unit of the driving operation handover system according to the first embodiment.
Figure 4:
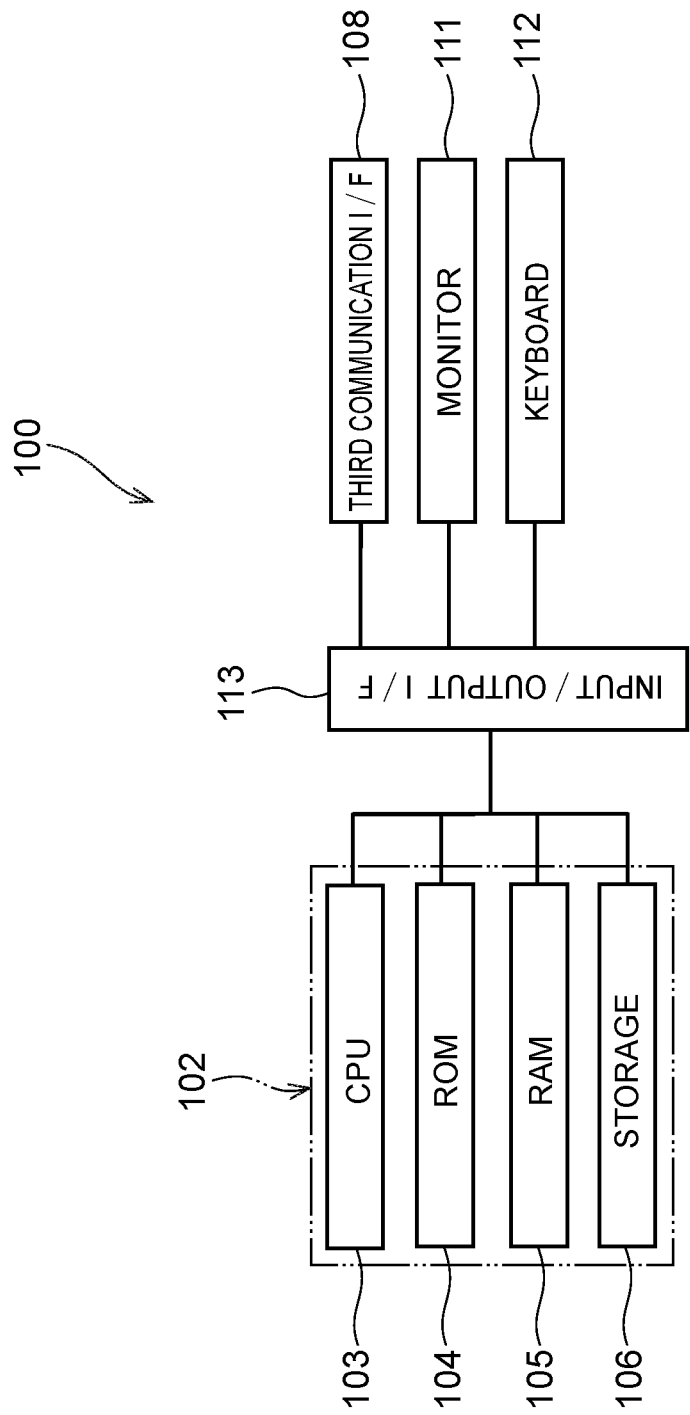
FIG. 4 is a block diagram showing a hardware configuration of a management unit of the driving operation handover system according to the first embodiment.

The first communication I/F 48 is connected via a network N shown in FIG. 1 to a second communication I/F 78 shown in FIG. 3 and a third communication I/F 108 shown in FIG. 4 which are described hereafter. The monitor 51 is configured to be able to display various information acquired by the ECU 42, and notifies the occupant PA by displaying the various information. The touch panel 52 is formed integrally with the monitor 51, and can input various types of information with respect to the information displayed on the monitor 51. At the touch panel 52, for example, a manual operation by the manual operation unit 40 and a remote operation by the remote operation unit 70 shown in FIG. 3 can be selected by a switching button (not shown). Information, as the desired information of the occupant PA, selected by the switching button is sent to the management unit 100 shown in FIG. 1.

The speaker 53 is configured so as to convert information transmitted from the management unit 100 described later, for example, information indicating that the driving operation of the vehicle 30 can be taken over, into a sound, and output the converted sound, for example, to notify the user. The torque unit 54 applies a load, for example, a torque, to a steering wheel 57 described below in accordance with an instruction from the ECU 42.

The operation unit 56 is configured to include a steering wheel 57, an accelerator pedal 58, and a brake pedal 59. The steering wheel 57 is configured to be able to change the steering angle of the vehicle 30 by being rotated around an axis by an occupant PA of the vehicle 30 shown in FIG. 1. The accelerator pedal 58 is configured to be able to change the speed and acceleration of the vehicle 30 by being depressed by the occupant PA. The brake pedal 59 is configured to decelerate or stop the vehicle 30 by being depressed by the occupant PA.

The sensor unit 62 includes a steering sensor 63, an accelerator sensor 64, and a brake sensor 65. The steering sensor 63 detects an operation amount of the steering wheel 57 by the occupant PA, for example, a steering angle, and outputs a detection result to the ECU 42. Accelerator sensor 64 detects a pedal force due to operation of accelerator pedal 58 by occupant PA, and outputs a detection result to ECU 42. The brake sensor 65 detects a pedaling force when the occupant PA operates the brake pedal 59 and outputs a detection result to the ECU 42. Although not shown, a yaw rate detection sensor for detecting the yaw rate of the vehicle 30 may be provided.

The GPS device 66 receives GPS signals from plural GPS satellites that are not shown, and measures the position of the vehicle 30. The navigation system 67 is configured to include a storage unit that stores map information, and based on the position information acquired from the GPS device 66 and the map information stored in the storage unit, displays the position of the vehicle 30 on a map, and performs processing to show the route to the destination. The timer 68 sends information on the current time and time to the ECU 42. In addition, the timer 68 is configured to be able to measure, for example, a time between two time points according to an instruction from the ECU 42. The time information measured by the timer 68 is transmitted to the ECU 42.

<Remote Operation Unit>

As shown in FIG. 3, the remote operation unit 70 has an ECU 72, a second communication interface 78, a monitor 79, a touch panel 81, a navigation system 82, a speaker 83, and a torque unit 84. Further, the remote operation unit 70 includes an operation unit 86, a sensor unit 90, a timer 94, and an input/output interface 95. The ECU 72 and each component are connected to each other via an input/output interface 95 so as to be able to communicate with each other. The remote operation unit 70 is operated by a remote operator PB shown in FIG. 1.

The ECU 72 has a CPU 73 as a processor, a ROM 74 as a memory, a RAM 75, and a storage 76 as a memory. The ROM 74 stores various types of programs and various types of data. The RAM 75 acts as a workspace for temporary storage of programs and data. As an example, the storage 76 is configured by flash ROM, and holds various programs including an operating system, and various data. The CPU 73 executes various programs recorded in the ROM 74 or the storage 76.

The second communication I/F 78 is connected via a network N shown in FIG. 1 to a first communication I/F 48 shown in FIG. 2 and a third communication I/F 108 shown in FIG. 4. The monitor 79 is configured to be able to display various information acquired by the ECU 72, and notifies the remote operator PB shown in FIG. 1 by displaying the various information. The touch panel 81 is formed integrally with the monitor 79, and can input various types of information with respect to the information displayed on the monitor 79.

The navigation system 82 is configured to include a storage unit that stores map information, and based on the position information acquired from the GPS device 66 shown in FIG. 2 and the map information stored in the storage unit, displays the position of the vehicle 30 on a map, and performs processing to show the route to the destination. The speaker 83 is configured so as to convert information transmitted from the management unit 100 shown in FIG. 1 and described later, for example, information indicating that the driving operation of the vehicle 30 can be taken over, into a sound, and output the converted sound, for example, to notify the user.

The torque unit 84 applies a load, for example, a torque, to a steering wheel 87 described below in accordance with an instruction from the ECU 72. The timer 94 sends information on the current time and time to the ECU 72. In addition, the timer 94 is configured to be able to measure, for example, a time between two time points according to an instruction from the ECU 72. The time information measured by the timer 94 is output to the ECU 72.

The operation unit 86 is configured to include a steering wheel 87, an accelerator pedal 88, and a brake pedal 89. The steering wheel 87 is configured to be able to change the steering angle of the vehicle 30 by being rotated around an axis by the remote operator PB. The accelerator pedal 88 is configured to be able to change the speed and acceleration of the vehicle 30 by being depressed by the remote operator PB. The brake pedal 89 is configured to decelerate or stop the vehicle 30 by being depressed by the remote operator PB.

The sensor unit 90 includes a steering sensor 91, an accelerator sensor 92, and a brake sensor 93. The steering sensor 91 detects an operation amount of the steering wheel 87 by the remote operator PB, for example, a steering angle, and outputs a detection result to the ECU 72. Accelerator sensor 92 detects a pedal force due to operation of accelerator pedal 88 by the remote operator PB, and outputs a detection result to ECU 72. The brake sensor 93 detects a pedaling force when the remote operator PB operates the brake pedal 89 and outputs a detection result to the ECU 72.

<Management Unit>

As shown in FIG. 4, the management unit 100 is configured as a server having a server control unit 102, a third communication interface 108, a monitor 111, a keyboard 112, and an input/output interface 113.

The server control unit 102 has a CPU 103 as a processor, a ROM 104 as a memory, a RAM 105, and a storage 106 as a memory. The ROM 104 stores various types of programs and various types of data. The RAM 105 acts as a workspace for temporary storage of programs and data. As an example, the storage 106 is configured by flash ROM, and holds various programs including an operating system, and various data. The CPU 103 executes various programs recorded in the ROM 104 or the storage 106. The setting information input on the keyboard 112 is displayed on the monitor 111.

Figure 8:
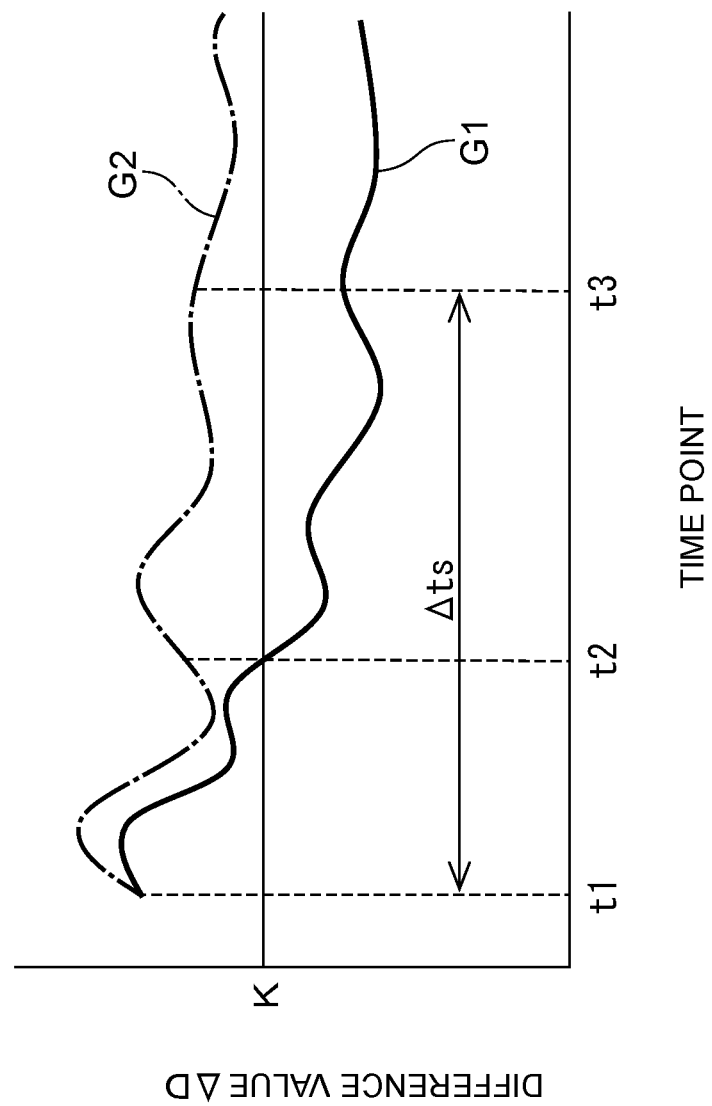
FIG. 8 is a graph showing a relationship between time and a difference value in the driving operation handover system according to the first embodiment.

The third communication I/F 108 is connected via a network N shown in FIG. 1 to a first communication I/F 48 shown in FIG. 2 and a second communication I/F 78 shown in FIG. 3. In a case in which a later-described difference value ΔD shown in FIG. 8 is smaller than a set threshold K, the server control unit 102 performs control of switching between a manual operation by the occupant PA on the manual operation unit 40 shown in FIG. 1 and a remote operation by the remote operator PB at the remote operation unit 70.

Functional Configuration

Figure 5:
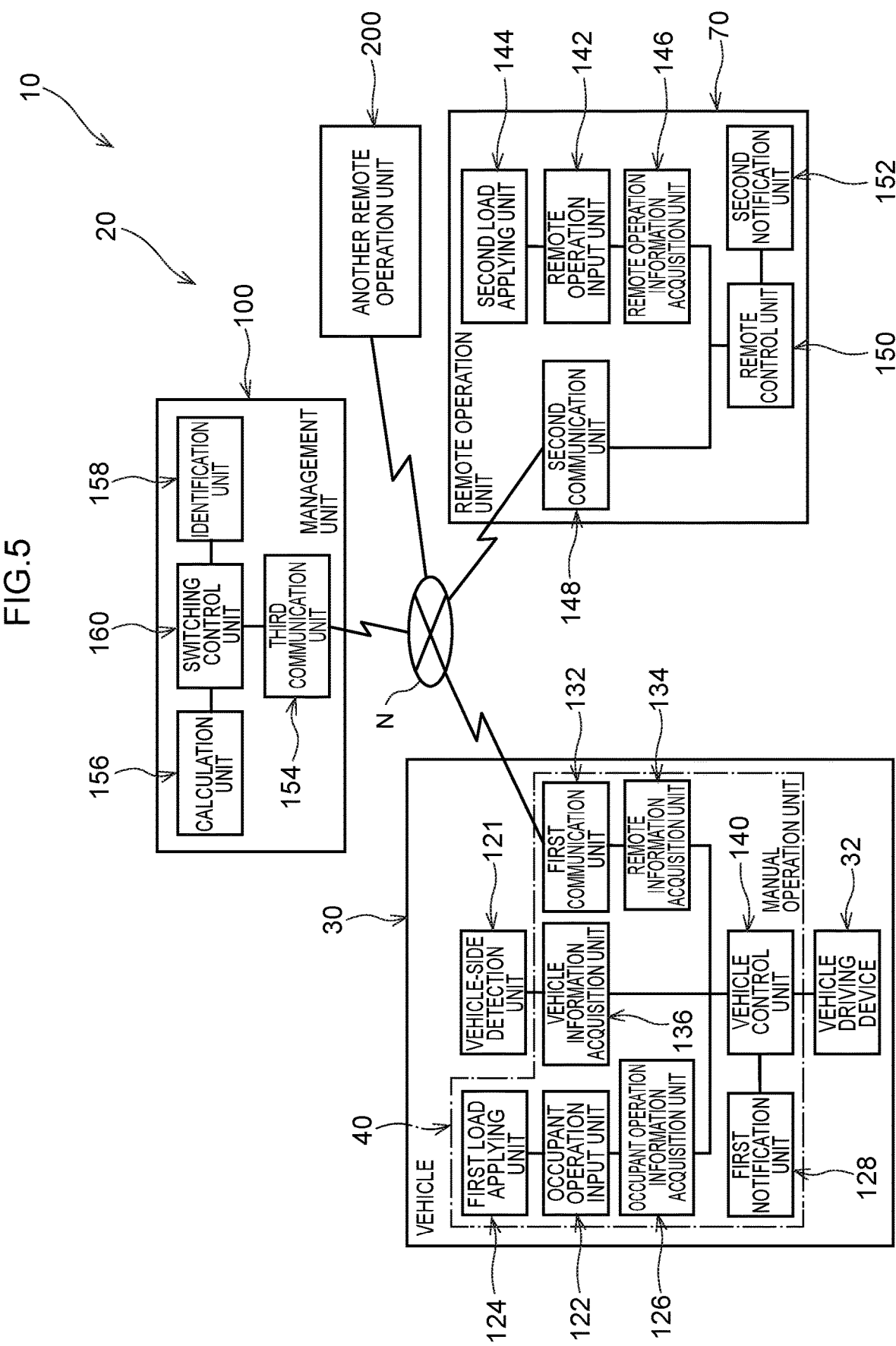
FIG. 5 is a block diagram showing a functional configuration of each component of the driving operation handover system according to the first embodiment.

The driving operation handover system 20 illustrated in FIG. 5 manages, that is, controls, the driving operation handover of the vehicle 30 by implementing various functions using the above hardware resources when executing the driving operation handover program. The functional configuration realized by the driving operation handover system 20 will be described below. In the following description, for each configuration shown in FIG. 1, FIG. 2, FIG. 3, and FIG. 4, there are cases in which individual figure numbers are omitted.

The driving operation handover system 20 includes an occupant operation information acquisition unit 126, a remote operation information acquisition unit 146, a calculation unit 156, a first notification unit 128 and a second notification unit 152, a switching control unit 160, an identification unit 158, and a first load applying unit 124 and a second load applying unit 144. The occupant operation information acquisition unit 126 is an example of a first acquisition unit and a manual acquisition unit. The remote operation information acquisition unit 146 is an example of a second acquisition unit. The first notification unit 128 and the second notification unit 152 are examples of a notification unit. The switching control unit 160 is an example of a switching unit. The first load applying unit 124 and the second load applying unit 144 are examples of a load applying unit.

The driving operation handover system 20 is divided into a manual operation unit 40 that is manually operated by an occupant PA, a remote operation unit 70 that is remotely operated by a remote operator PB, and a management unit 100 that manages switching of the driving operation of the vehicle 30. The other remote operation unit 200 is different from the remote operation unit 70 in that the operator is another remote operator PB, but has the same configuration as that of the remote operation unit 70, and thus the description is omitted. In the driving operation handover system 20, for example, one of the plurality of remote operators PB is selected as the operator.

The vehicle 30 includes a vehicle driving device 32, a manual operation unit 40, and a vehicle-side detection unit 121. As an example, the vehicle-side detection unit 121 is configured to detect a traveling state of the vehicle 30 by detecting a steering angle, a speed, an acceleration, and the like of the vehicle 30. Further, various kinds of information on the vehicle 30 detected by the vehicle-side detection unit 121 are sent to the second communication unit 148 and the third communication unit 154 via the first communication unit 132 and the network N described below.

<Manual Operation Unit>

The manual operation unit 40 includes, as functional components, an occupant operation input unit 122, a first load application unit 124, an occupant operation information acquisition unit 126, a first notification unit 128, a first communication unit 132, a remote information acquisition unit 134, a vehicle information acquisition unit 136, and a vehicle control unit 140. Each functional configuration is realized by the CPU 43 of the manual operation unit 40 reading out a program and information stored in the ROM 44 or the storage 46, and outputting to the RAM 45 and executing the program in the RAM 45.

The occupant operation input unit 122 is a part where manual operation of the vehicle 30 by the occupant PA, that is, manual operation, is performed, and where information on the manual operation, for example, information such as a steering angle and an accelerator opening amount, is input. In addition, the occupant operation input unit 122 transmits the input information to the occupant operation information acquisition unit 126.

The first load applying unit 124 is provided in the manual operation unit 40. In addition, when the operation unit that performs the driving operation of the vehicle 30 is switched from the manual operation unit 40 to the remote operation unit 70, the first load application unit 124 is configured to provide load to the driving operation by the occupant operation input unit 122 on the manual operation unit 40 side, that is, the side that relinquishes the driving operation. The first load applying unit 124 applies a torque to the rotation of the steering wheel 57, for example. When the operation unit is switched from the remote operation unit 70 to the manual operation unit 40, the application of the torque by the first load applying unit 124 is released.

The occupant operation information acquisition unit 126 acquires a first characteristic value A (not shown) of a preset characteristic while the vehicle 30 is traveling. In the present embodiment, as one example of the setting characteristic, an accelerator opening degree indicated in unit %, which is one of the operation amounts, is set. Descriptions of other operation amounts, for example, the steering angle and the like are omitted. Further, the occupant operation information acquisition unit 126 transmits the acquired information on the accelerator opening degree to the vehicle control unit 140.

The first notification unit 128 notifies the occupant PA that the driving operation of the vehicle 30 can be taken over when the difference value ΔD calculated by the calculation unit 156 described below becomes smaller than the set threshold K shown in FIG. 8. More specifically, the first notification unit 128 notifies the occupant PA that the driving operation can be taken over by displaying a message indicating that the driving operation can be taken over on the monitor 51. In addition, in a case in which the difference value ΔD does not become smaller than the set threshold K within the preset set time Δts illustrated in FIG. 8, for example, in a case in which time runs out, the first notification unit 128 notifies that the switching control unit 160, which will be described later, does not switch the driving operation. Further, the first notification unit 128 recommends the occupant PA to change to another remote operation unit 200, for example, another remote operator PB, when the time is out.

The first communication unit 132 transmits the information of the above-described first characteristic value A to the management unit 100 described below via the network N. In addition, first communication unit 132 receives remote information (information for remotely controlling vehicle 30) from remote operation unit 70. Further, the first communication unit 132 receives switching information of the driving operation of the vehicle 30, for example, information of a manual operation or a remote operation, from the management unit 100.

The remote information acquisition unit 134 acquires remote information from the first communication unit 132. Then, the remote information acquisition unit 134 transmits the acquired remote information to the vehicle control unit 140.

The vehicle information acquisition unit 136 acquires various information of the vehicle 30 detected by the vehicle-side detection unit 121, for example, information such as a steering angle, a speed, and an acceleration. Then, the vehicle information acquisition unit 136 transmits the acquired various information of the vehicle 30 to the vehicle control unit 140.

The vehicle control unit 140 controls the driving of the vehicle driving device 32 based on manual information transmitted from the occupant operation information acquisition unit 126, for example, information on manual operation or remote information transmitted from the remote information acquisition unit 134. As an example, the manual operation by the manual operation unit 40 and the remote operation by the remote operation unit 70 are switched by a switching control unit 160 described later. Further, the vehicle control unit 140 transmits various information acquired by the vehicle information acquisition unit 136 to the remote operation unit 70 and the management unit 100. Further, in the case of manual operation, vehicle control section 140 controls driving of vehicle driving device 32 based on information acquired from occupant operation information acquisition section 126.

<Remote Operation Unit>

The remote operation unit 70 includes, as functional components, a remote operation input unit 142, a second load application unit 144, a remote operation information acquisition unit 146, a second communication unit 148, a second notification unit 152, and a remote control unit 150. Each functional configuration is realized by the CPU 73 of the manual operation unit 70 reading out a program and information stored in the ROM 74 or the storage 76, and outputting to the RAM 75 and executing the program in the RAM 75.

The remote operation input unit 142 is a part where remote operation of the vehicle 30 by the remote operator PB, that is, remote operation, is performed, and where remote operation information of the vehicle 30, for example, information such as a steering angle and an accelerator opening amount, is input. Further, the remote operation input unit 142 transmits the input information of the remote operation to the remote operation information acquisition unit 146.

The second load applying unit 144 is provided in the remote operation unit 70. In addition, when the operation unit that performs the driving operation of the vehicle 30 is switched from the remote operation unit 70 to the manual operation unit 40, the second load application unit 144 is configured to provide load to the driving operation by the remote operation input unit 142 on the remote operation unit 70 side, that is, the side that relinquishes the driving operation. The second load applying unit 144 applies a torque to the rotation of the steering wheel 87, for example. When the operation unit is switched from the manual operation unit 40 to the remote operation unit 70, the application of the torque by the second load applying unit 144 is released.

Figure 7:
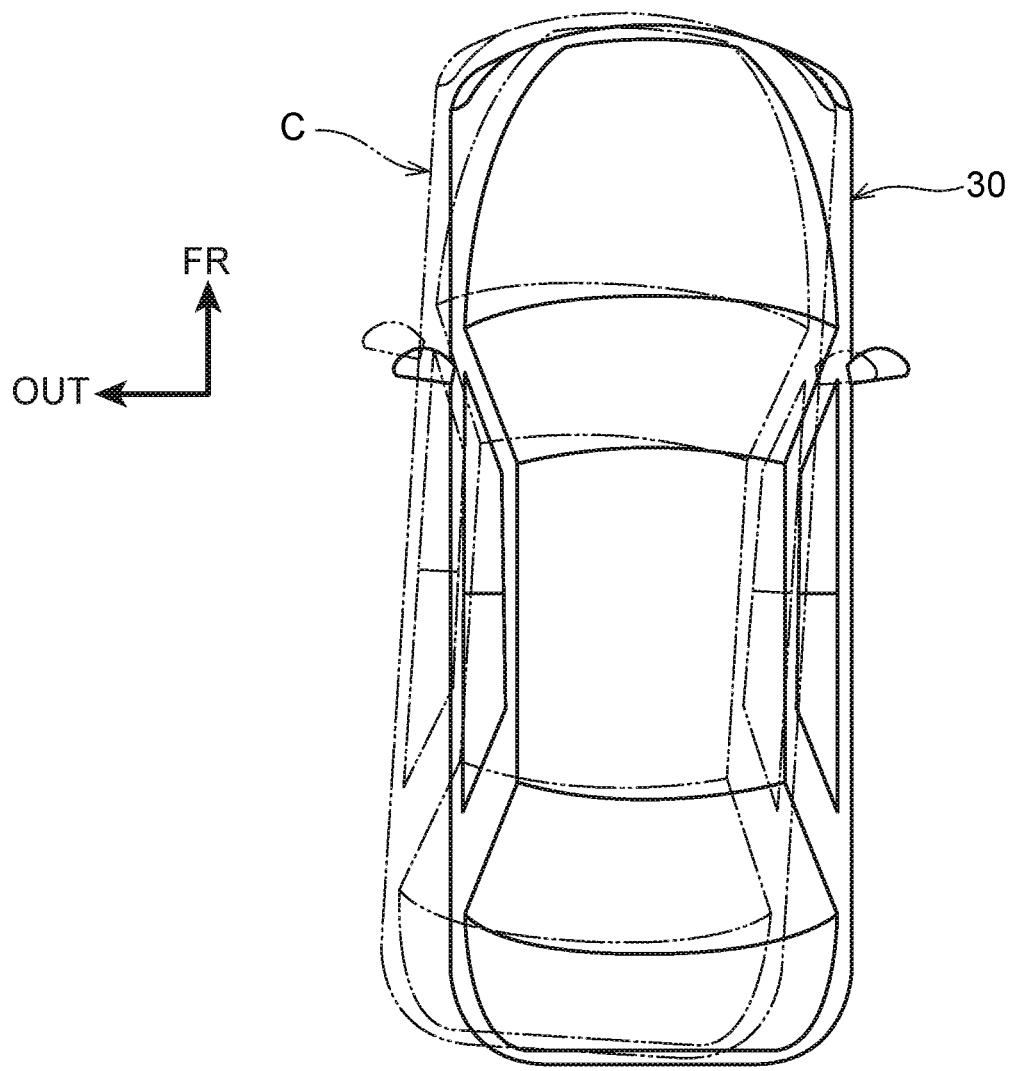
FIG. 7 is a plan view showing a vehicle and a virtual vehicle operated by the driving operation handover system according to the first embodiment.

The remote operation information acquisition unit 146 acquires the second characteristic value B of the accelerator release B as one example of the above-described setting characteristics during traveling of the virtual vehicle C illustrated in FIG. 7 simulated by the vehicle 30 that is operated by the remote operator PB using the remote operation unit 70. Descriptions of other operation amounts, for example, the steering angle and the like are omitted. Further, the remote operation information acquisition unit 146 transmits the acquired information on the accelerator opening amount to the remote control unit 150.

The second communication unit 148 transmits the information of the above-described second characteristic value B to the management unit 100 described below via the network N. In addition, the second communication unit 148 transmits remote information, for example, information for remotely operating the vehicle 30, from the remote operation unit 70 to the first communication unit 132 via the network N. Further, the second communication unit 148 receives switching information of the driving operation of the vehicle 30, for example, information of a manual operation or a remote operation, from the management unit 100.

The second notification unit 152 notifies the remote operator PB that the driving operation of the vehicle 30 can be taken over when the difference value ΔD calculated by the calculation unit 156 described below becomes smaller than the set threshold K shown in FIG. 8. More specifically, the second notification unit 152 notifies the remote operator PB that the driving operation can be taken over by displaying a message indicating that the driving operation can be taken over on the monitor 79. In addition, the second notification unit 152 notifies that the switching control unit 160 described later does not switch the driving operation when the difference value ΔD does not become smaller than the set threshold value K within the set time.

The remote control unit 150 remotely controls the driving of the vehicle driving device 32 based on the remote information transmitted from the remote operation information acquisition unit 146, that is, information on the remote operation. Further, the remote control unit 150 transmits various information acquired by the remote operation information acquisition unit 146 to the first communication unit 132 of the manual operation unit 40 and the third communication unit 154 of the management unit 100.

<Management Unit>

The management unit 100 includes, as a functional configuration, a third communication unit 154, a calculation unit 156, an identification unit 158, and a switching control unit 160. Each functional configuration is realized by the CPU 103 of the management unit 100 reading out a program and information stored in the ROM 104 or the storage 106, and outputting to the RAM 105 and executing the program in the RAM 105.

The third communication unit 154 receives the information of the first characteristic value A and the second characteristic value B described above via the network N. Further, the third communication unit 154 transmits the received information to the switching control unit 160. Further, the third communication unit 154 transmits switching information of a driving operation of the vehicle 30, for example, information of a manual operation or a remote operation, to the first communication unit 132 and the second communication unit 148 via the network N.

The calculation unit 156 calculates a difference value ΔD between the first characteristic value A and the second characteristic value B received from the switching control unit 160, that is, |A-B|, for the setting characteristic, for example, the accelerator opening amount. In addition, the arithmetic unit 156 transmits information of the acquired difference value ΔD to the switching control unit 160.

Figure 6:
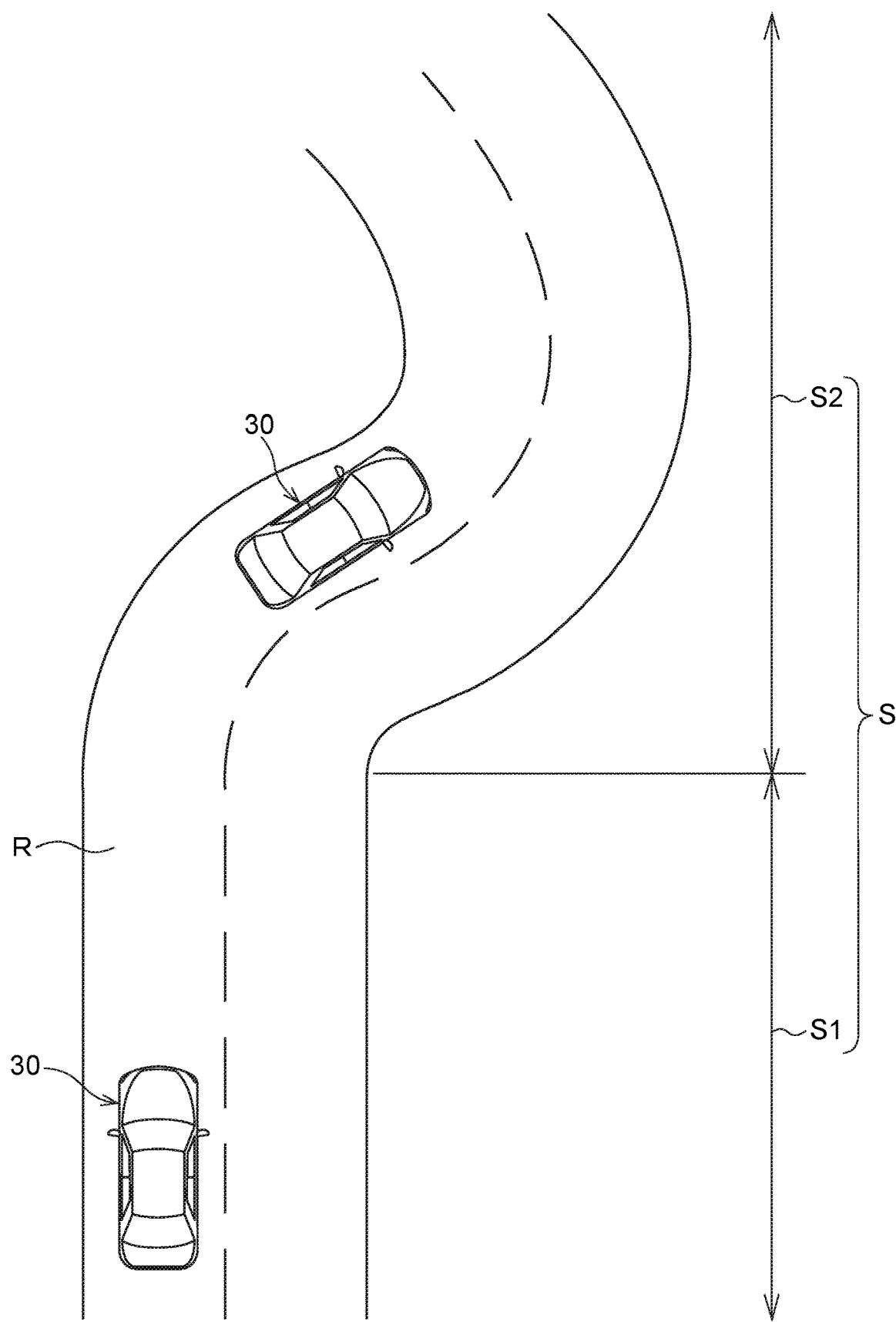
FIG. 6 is a diagram illustrating an example of a handover possible section and a non-switchable section of a traveling route defined in the driving operation handover system according to the first embodiment.

The identification unit 158 identifies whether the traveling section S of the vehicle 30 shown in FIG. 6 is a switchable section S1 shown in FIG. 6 described later or a non-switchable section S2 shown in FIG. 6. The identification of the traveling section S is performed based on the position information of the vehicle 30 using the GPS device 66 and the information on the traveling route R illustrated in FIG. 6 using the navigation system 82.

The switching control unit 160 switches the driving operation of the vehicle 30 from one of the remote operator PB and the occupant PA to the other after the notification of the information relating to handover by the first notification unit 128 and the second notification unit 152. In addition, when the identification unit 158 identifies that it is the switching impossible section S2 described below, the switching control unit 160 is configured so as not to perform switching of the driving operation even if the difference value ΔD is smaller than the set threshold K. Further, the switching control unit 160 is configured not to switch the driving operation when the difference value ΔD does not become smaller than the set threshold value K within the set time Δts shown in FIG. 8.

<Setting of Section>

As shown in FIG. 6, in the present embodiment, as an example, a part of the traveling section S in which the traveling path R of the vehicle 30 extends linearly is a driving operation switchable section S1 in which remote operation can be switched by the switching control unit 160. A part of the traveling section S in which the traveling path R is curved is set as a switch-disabled section S2 in which the switching of the driving operation by the switching control unit 160 is disabled.

<Vehicles and Virtual Vehicles>

In FIG. 7, the vehicle 30 is indicated by a solid line, and the virtual vehicle C is indicated by a two-dot chain line. Note that the arrow FR indicates a vehicle front, and the arrow OUT indicates a vehicle width direction outer side. As an example, the virtual vehicle C is in a position that is misaligned sideways as shown in the figure due to not only the accelerator opening degree but also steering angle and the like differing with respect to the vehicle 30. The case where the difference values ΔD=0 in all the setting characteristics for the vehicle 30 and the virtual vehicle C means that the vehicle 30 and the virtual vehicle C overlap so that they match when viewed from the vehicle up-down direction.

<Difference Value Graph>

FIG. 8 shows a graph G1 when the difference value ΔD falls within the set threshold K within the set time Δts, and a graph G2 when the difference value ΔD at each time point does not fall within the set threshold K within the set time Δts. The set time Δts corresponds to the time from time t1 to time t3. The time point t2 is a time point between the time point t1 and the time point t3, and represents a time point when the difference value ΔD=the set threshold value K for the graph G1. As shown in a graph G1, when the difference value ΔD becomes equal to or smaller than the set threshold K within the set time Δts from the start time t1, handover of the driving operation is performed by the manual operation unit 40 shown in FIG. 5 and the remote operation unit 70 shown in FIG. 5. As shown in a graph G2, when the difference value ΔD does not become equal to or smaller than the set threshold K within the set time Δts from the start time t1, handover by the manual operation unit 40 and the remote operation unit 70 is not performed.

Operation and Advantageous Effects

Explanation follows regarding operation of the driving operation handover system 20 of the first exemplary embodiment.

(Processing of Manual Operation Unit)

Figure 9:
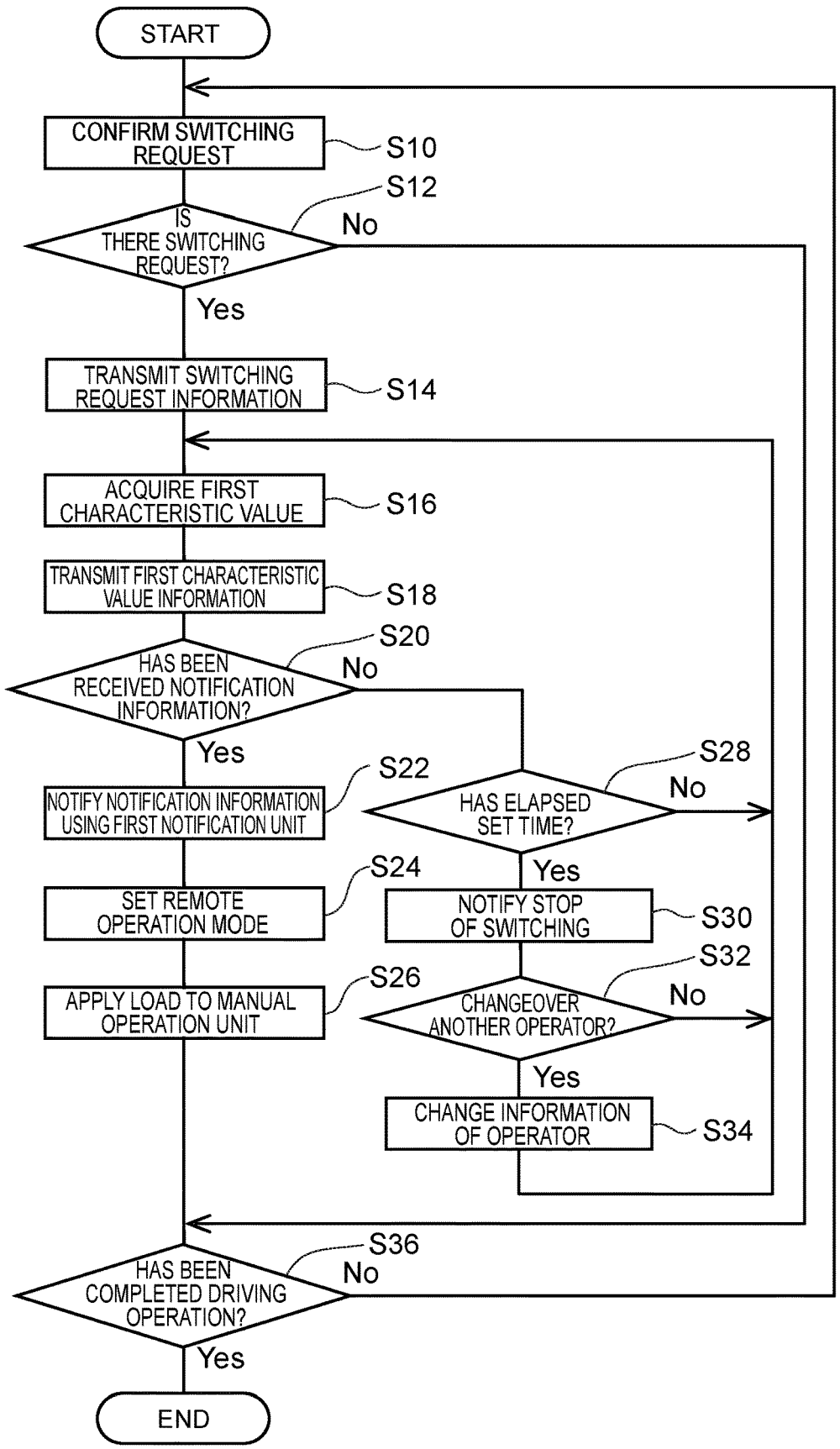
FIG. 9 is a flowchart illustrating a flow of a process of driving operation handover in a manual operation unit of the driving operation handover system according to the first embodiment.

FIG. 9 is a flowchart illustrating a flow of the driving operation handover process performed by the ECU 42 of the manual operation unit 40 illustrated in FIG. 2. Note that in the description of FIG. 9, FIG. 10, and FIG. 11, each component in the driving operation handover system 20 is referred to in each of FIG. 1 to FIG. 5, and individual figure numbers are omitted. Here, as an example, a case will be described in which the occupant PA presses a switching button (not shown) to switch an operation from manual operation to remote operation, that is, switching of driving operation.

In step S10, the CPU 43 confirms an operation switching request from the occupant PA by detecting ON or OFF of a switching button (not shown), that is, acquires information on the presence or absence of the request. The information on the presence or absence of the request means information on wanting to continue the manual operation or information on wanting the remote operation. Processing then transitions to step S12.

In step S12, the CPU 43 determines whether or not there is an operation switching request. If there is a switching request, that is, if Yes in S12, the process proceeds to step S14. If there is no switching request, that is, if No in S12, the process proceeds to step S36.

In step S14, the CPU 43 transmits switching request information, for example, information indicating that switching has been performed, to the management unit 100 via the network N. Processing then transitions to step S16.

In step S16, the CPU 43 acquires the first characteristic value A from the occupant operation information acquisition unit 126. Processing then transitions to step S18.

In step S18, the CPU 43 transmits information on the first characteristic value A to the management unit 100. Processing then transitions to step S20.

In step S20, the CPU 43 determines whether the notification information has been received from the management unit 100. If the notification information has been received, that is, if Yes in S20, the process proceeds to step S22. If the notification information has not been received, that is, if No in S20, the process proceeds to step S28.

In step S22, the CPU 43 notifies the notification information using the first notification unit 128. In other words, the occupant PA is notified that the transfer can be performed. Processing then transitions to step S24.

In step S24, the CPU 43 sets the remote operation mode in the manual operation unit 40. Specifically, the input from the occupant operation input unit 122 is blocked, and the operation of the vehicle driving device 32 is controlled based on the input from the remote information acquisition unit 134. Processing then transitions to step S26.

In step S26, the CPU 43 applies a load to the manual operation unit 40. Specifically, a load is applied to the occupant operation input unit 122 using the first load applying unit 124. Processing then transitions to step S36.

In step S28, the CPU 43 determines whether or not the elapsed time from the reception of the first characteristic value A and the second characteristic value B has exceeded the set time Δts based on the information on the elapsed time transmitted from the management unit 100. If the set time Δts has elapsed, that is, if Yes in S28, the process proceeds to step S30. If it is within the set time Δts (S28: No), the process proceeds to step S16.

In step S30, the CPU 43 notifies by first notification unit 128 that the switching of the operation has been stopped. Processing then transitions to step S32.

In step S32, the CPU 43 displays another remote operator PB at the monitor 51, and confirms with the occupant PA whether or not changeover to the other remote operator PB is to be requested. When the occupant PA operates the touch panel 52 and desires another remote operator PB, that is, in the case of Yes in S32, the process proceeds to step S34. If the occupant PA operates the touch panel 52 to request the current remote operator PB, that is, if No in S28, the process proceeds to step S16.

In step S34, the CPU 43 changes the information relating to the remote operation unit 70 and the remote operator PB from the current information to the information of the other remote operation unit 200 and the other remote operator PB. Processing then transitions to step S16.

In step S36, the CPU 43 determines whether the driving operation of the vehicle 30 has ended based on the detection result of an ignition sensor (not shown). If it is determined that the driving operation has been completed, that is, if Yes in S36, the program ends. If it is determined that the driving operation is to be continued, that is, if No in S36, the process proceeds to step S10.

(Processing of Remote Operation Unit)

Figure 10:
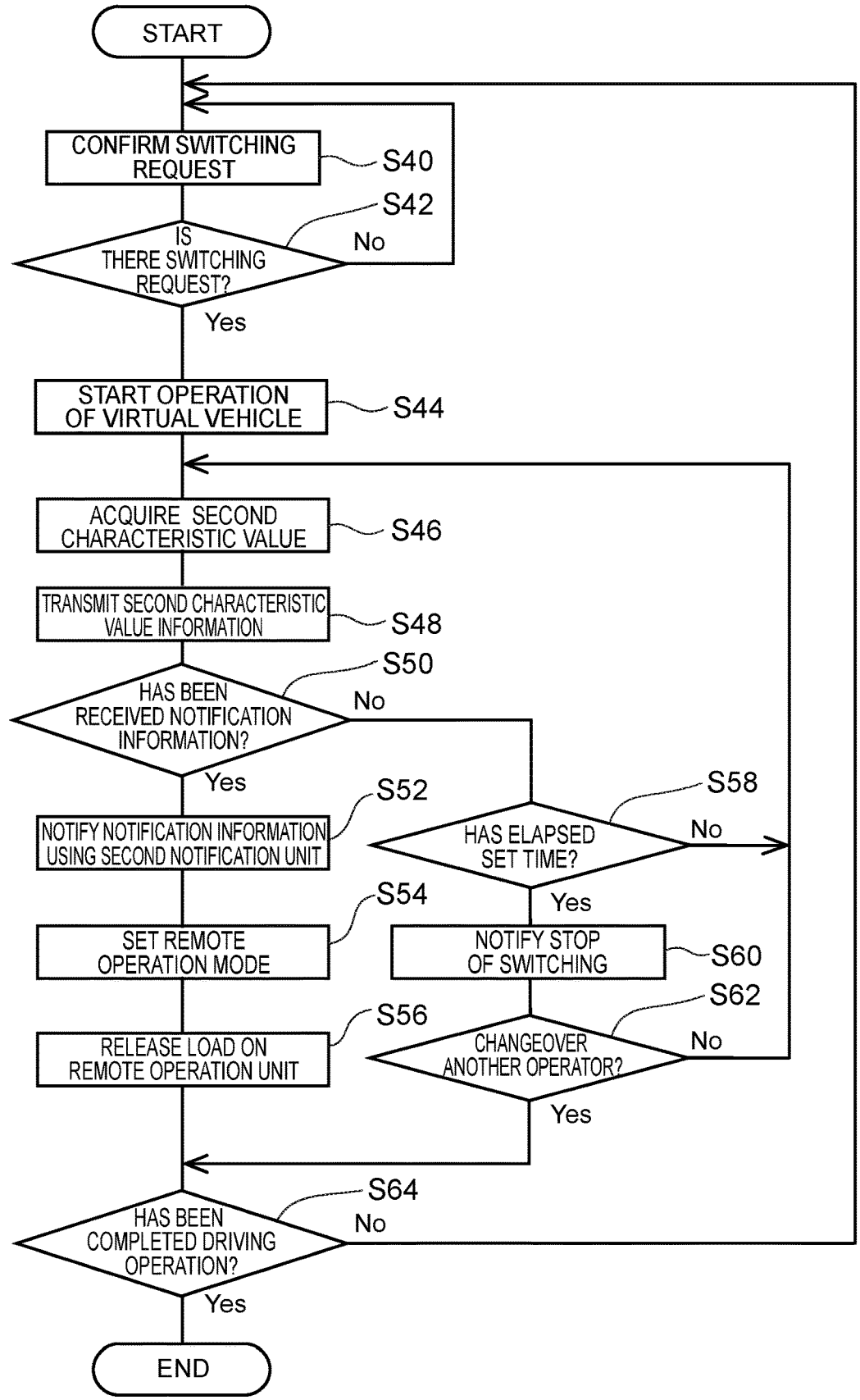
FIG. 10 is a flowchart illustrating a flow of a process of driving operation handover in a remote operation unit of the driving operation handover system according to the first embodiment.

FIG. 10 is a flowchart illustrating a flow of the driving operation handover process by the ECU 72 of the remote operation unit 70 illustrated in FIG. 3.

In step S40, the CPU 73 acquires information on the presence or absence of a switching request from the manual operation unit 40, that is, confirms the switching request. Processing then transitions to step S42.

In step S42, the CPU 73 determines whether or not there is an operation switching request. If there is a switching request, that is, if Yes in S42, the process proceeds to step S44. If there is no switching request, that is, if No in S42, the process proceeds to step S40.

In step S44, the CPU 73 displays the start of the remote operation on the monitor 79 and starts the operation of the virtual vehicle C based on the input of the remote operation input unit 142. At this point, the remote operation of the vehicle 30 by the remote operation unit 70 has not been performed. Processing then transitions to step S46.

In step S46, the CPU 73 acquires the second characteristic value B for the virtual vehicle C from the remote operation information acquisition unit 146. Processing then transitions to step S48.

In step S48, the CPU 73 transmits information on the second characteristic value B to the management unit 100. Processing then transitions to step S50.

In step S50, the CPU 73 determines whether the notification information has been received from the management unit 100. If the notification information has been received, that is, if Yes in S50, the process proceeds to step S52. If the notification information has not been received, that is, if No in S50, the process proceeds to step S58.

In step S52, the CPU 73 notifies the notification information using the second notification unit 152. That is, it notifies the remote operator PB that the handover is possible. Processing then transitions to step S54.

In step S54, the CPU 73 sets the remote operation mode in the manual operation unit 70. Specifically, a remote operation mode of the vehicle driving device 32 is set by the remote operation unit 70, and transmission of the input information from the remote operation input unit 142 to the manual operation unit 40 is started. Processing then transitions to step S56.

In step S56, the CPU 73 releases the load on the remote operation unit 70. Specifically, the load applied to the remote operation input unit 142 by the second load applying unit 144 is released. Processing then transitions to step S60.

In step S58, the CPU 73 determines whether or not the elapsed time from the reception of the first characteristic value A and the second characteristic value B has exceeded the set time Δts based on the information on the elapsed time transmitted from the management unit 100. If the set time Δts has elapsed, that is, if Yes in S58, the process proceeds to step S60. If it is within the set time Δts, that is, if No in S58, the process proceeds to step S46.

In step S60, the CPU 73 notifies by the second notification unit 152 that the switching of the operation has been stopped. Processing then transitions to step S62.

In step S62, the CPU 73 confirms whether or not another remote operator PB has been switched to. If another remote operator PB is desired, that is, if Yes in S62, the process proceeds to step S64. If the current status is maintained, that is, if No in S62, the process proceeds to step S46.

In step S64, the CPU 73 determines whether the driving operation has ended based on the detection result of an ignition sensor (not shown). If it is determined that the driving operation has been completed, that is, if Yes in S64, the program ends. If it is determined that the driving operation is to be continued, that is, if No in S64, the process proceeds to step S40.

(Processing of Permission Section)

Figure 11:
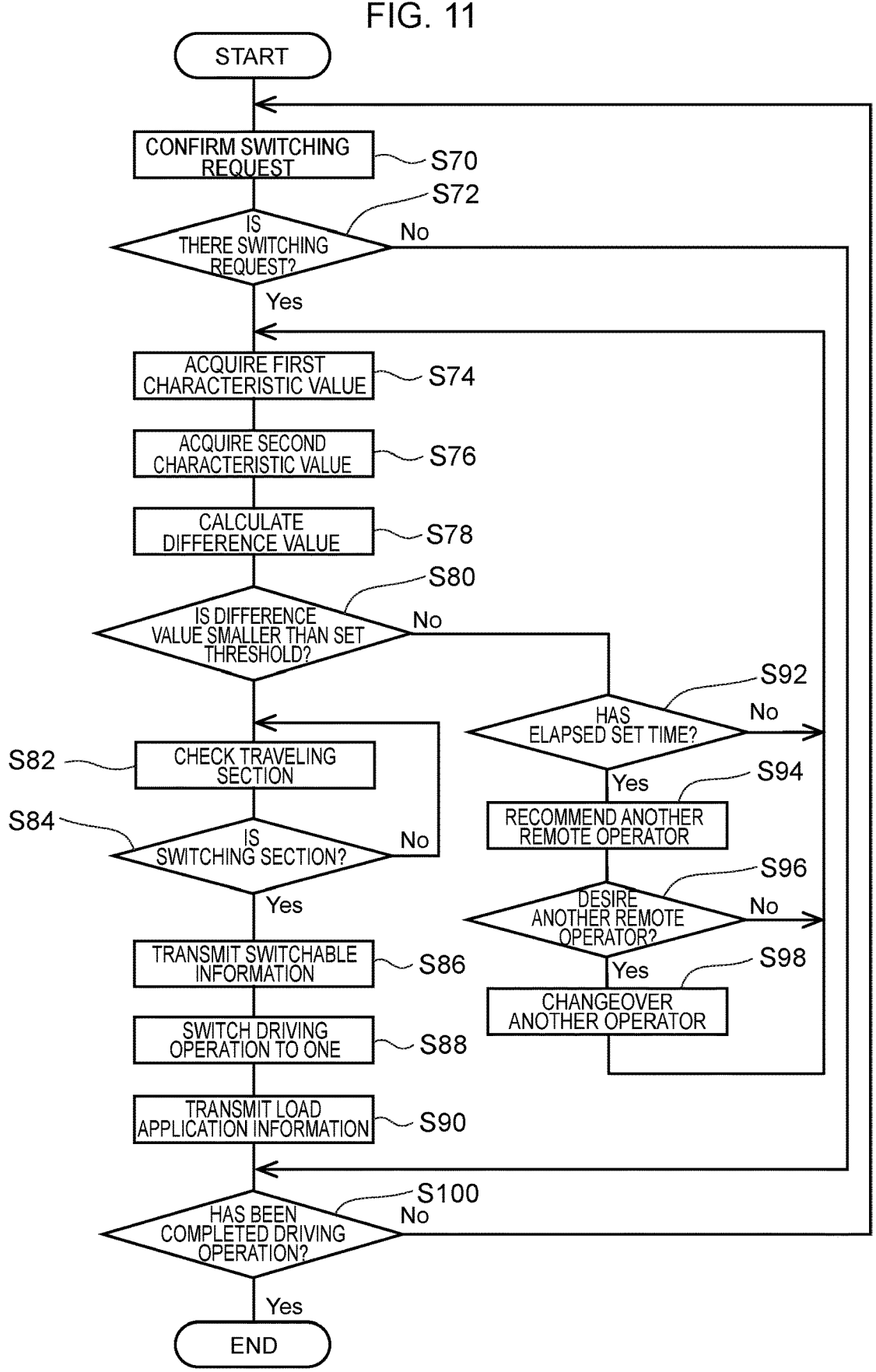
FIG. 11 is a flowchart illustrating a flow of a process of driving operation handover in the management unit of the driving operation handover system according to the first embodiment.

FIG. 11 is a flowchart illustrating a flow of the driving operation handover process performed by the switching control unit 160 of the management unit 100.

In step S70, the CPU 103 acquires information related to a switching request of the driving operation from the manual operation unit 40, for example, confirms whether there is a switching request. Processing then transitions to step S72.

In step S72, the CPU 103 determines whether or not there is an operation switching request. If there is a switching request, that is, if Yes in S72, the process proceeds to step S74. If there is no switching request, that is, if No in S72, the process proceeds to step S100.

In step S74, the CPU 103 acquires the first characteristic value A of the vehicle 30 from the manual operation unit 40. Processing then transitions to step S76.

In step S76, the CPU 103 acquires the second characteristic value B for the virtual vehicle C from the remote operation unit 70. Processing then transitions to step S78.

In step S78, the CPU 103 causes the calculation unit 156 to calculate the difference value ΔD. Processing then transitions to step S80.

In step S80, the CPU 103 determines whether or not the difference value ΔD is smaller than the set threshold K. If the difference value ΔD is smaller than the set threshold K, that is, if Yes in S80, the process proceeds to step S82. If the difference value ΔD is equal to or larger than the set threshold K, that is, if No in S80, the process proceeds to step S92.

In step S82, the CPU 103 specifies the current position of the vehicle 30 from the information of the GPS device 66, and checks the traveling section S of the aforementioned position. The information of the traveling section S, that is, the map information, may be read from the storage 106 or may be received from the navigation system 67. Processing then transitions to step S84.

In step S84, the CPU 103 determines whether the traveling section S is the switchable section S1 or the switch-disabled section S2. If the traveling section S is the switchable section S1, that is, if Yes in S84, the process proceeds to step S86. If the traveling section S is the non-switchable (switch-disabled) section S2, that is, if No in S84, the process proceeds to step S82.

In step S86, the CPU 103 transmits to the manual operation unit 40 and the remote operation unit 70 information indicating that switching from manual operation to remote operation is possible, that is, switchable information. Processing then transitions to step S88.

In step S88, the CPU 103 switches the driving operation of the vehicle 30 to one. As an example, the driving operation by the occupant operation input unit 122 of the manual operation unit 40 is prohibited, and the driving operation by the remote operation input unit 142 of the remote operation unit 70 is permitted. Processing then transitions to step S90.

In step S90, the CPU 103 transmits the load application information to the manual operation unit 40 and the remote operation unit 70. Specifically, by transmitting the load application information to the manual operation unit 40 and operating the first load application unit 124, the load is applied to the occupant operation input unit 122. Further, by transmitting the information of load release to the remote control unit 70 and operating the second load applying unit 144, the load acting on the remote control input unit 142 is released. Processing then transitions to step S100.

In step S92, the CPU 103 measures the elapsed time from when the first characteristic value A and the second characteristic value B are received by a timer (not shown). Then, it is determined whether or not the acquired elapsed time has elapsed the set time Δts. If the set time Δts has elapsed, that is, if Yes in S92, the process proceeds to step S94. If it is within the set time Δts, that is, if No in S92, the process proceeds to step S74.

In step S94, the CPU 103 transmits information on the other remote operation unit 200 and another remote operator PB to the manual operation unit 40. That is, another remote operator PB is recommended to the occupant PA. Processing then transitions to step S96.

In step S96, the CPU 103 receives, that is, acquires, from the manual operation unit 40, the information regarding the presence or absence of the change of the remote operator PB, and determines whether or not the occupant PA desires to change to another remote operator PB. If change to another remote operator PB is desired, that is, if Yes in S96, the process proceeds to step S98. If change to another remote operator PB is not desired, that is, if No in S96, the process proceeds to step S74.

In step S98, the CPU 103 transfers the authority of the remote operation to the other remote operator PB and the other remote operation unit 200, that is, changes the authority. Processing then transitions to step S74. When the authority of the remote operation is transferred to another remote operation unit 200, the difference value ΔD is calculated again, and it is determined whether or not the difference value ΔD is smaller than the set threshold K. During this time, the driving operation of the vehicle 30 is performed by the manual operation unit 40.

In step S100, the CPU 103 determines whether the driving operation has ended based on the detection result of an ignition sensor (not shown). If it is determined that the driving operation has been completed, that is, if Yes in S100, the program ends. If it is determined that the driving operation is to be continued, that is, if No in S100, the process proceeds to step S70.

As described above, in the driving operation handover system 20, when the difference value ΔD acquired by the calculation unit 156 becomes smaller than the set threshold K, the first notification unit 128 and the second notification unit 152 notify the occupant PA and the remote operator PB that the driving operation of the vehicle 30 can be taken over. After the notification by the first notification unit 128 and the second notification unit 152, the switching control unit 160 switches the driving operation of the vehicle 30 from one of the occupant PA and the remote operator PB to the other. As described above, when the difference value ΔD becomes smaller than the set threshold K and the driving operation state of the vehicle 30 by the occupant PA and the driving operation state of the virtual vehicle C by the remote operator PB are close to each other, driving operation of the vehicle 30 is switched from one of the occupant PA and the remote operator PB to the other. As a result, the driving operation can be switched while the vehicle 30 is traveling, so that the driving operation can be taken over between the occupant PA and the remote operator PB without stopping the vehicle 30.

In the driving operation handover system 20, the operation amount of the manual operation unit 40 is set to the first characteristic value A, and the operation amount of the remote operation unit 70 is set to the second characteristic value B. Here, since the operation amount of each operation unit is easier to detect than the case where the state amount of the vehicle 30 is detected, it is possible to easily acquire the difference value ΔD.

Further, in the driving operation handover system 20, when the identification unit 158 identifies the non-switchable section S2, the switching control unit 160 does not carry out the switching operation even in the case in which the difference value ΔD is smaller than the set threshold K. As a result, in the non-switchable section S2 where caution is required for the driving operation, such as a turning corner, a hill, or a narrow road, the switching of the driving operation by the switching control unit 160 is not performed, and occurrence of a driving operation mistake in a non-switchable section S2 can be prevented.

In addition, in the driving operation handover system 20, when the difference value ΔD does not become smaller than the setting threshold K within the setting time Δts, for example, when the setting time Δts has elapsed, the switching control unit 160 does not switch the driving operation. Then, except for the case where another remote operator PB is selected, the first notification unit 128 and the second notification unit 152 notify that the switching of the driving operation is stopped. This eliminates the need for the occupant PA and the remote operator PB to continue waiting without knowing whether or not the driving operation can be switched, thereby the generation of dissatisfaction in the occupant PA and the remote operator PB is able to be suppressed.

In the driving operation handover system 20, when the difference value ΔD does not become smaller than the set threshold K within the set time Δts, the first notification unit 128 recommends the occupant PA to change to another remote operator PB. This eliminates the need for the occupant PA to continue waiting without knowing whether or not the driving operation can be switched, thereby the generation of dissatisfaction in the occupant PA is able to be suppressed.

Further, in the driving operation handover system 20, a load is applied to the driving operation unit that transfers the driving operation among the manual operation unit 40 and the remote operation unit 70. Thereby, even if there is no display or the like, the occupant PA or the remote operator PB on the side that has handed over the driving operation can recognize that the driving operation has been handed over even when the handover state is not notified using the display or the voice.

In the vehicle 30, when the difference value ΔD between the first characteristic value A and the second characteristic value B becomes smaller than the set threshold value K, the first notification unit 128 can notify the occupant PA that take over of the driving operation of the vehicle 30 is possible. Then, after the notification by the first notification unit 128, the driving operation of the vehicle 30 is switched from one of the occupant PA and the remote operator PB to the other. As described above, when the difference value ΔD becomes smaller than the set threshold K and the driving operation state of the vehicle 30 by the occupant PA and the driving operation state of the virtual vehicle C by the remote operator PB are close to each other, driving operation of the vehicle 30 is switched from one of the occupant PA and the remote operator PB to the other. As a result, the driving operation can be switched while the vehicle 30 is traveling, so that the driving operation can be taken over between the occupant PA and the remote operator PB without stopping the vehicle 30.

Second Exemplary Embodiment

Explanation follows regarding the driving operation handover system 170 of the second exemplary embodiment. In addition, regarding the configuration basically the same as the driving operation handover system 20 shown in FIG. 1 of the first embodiment, the same reference numbers are given and the description is omitted.

Figure 12:
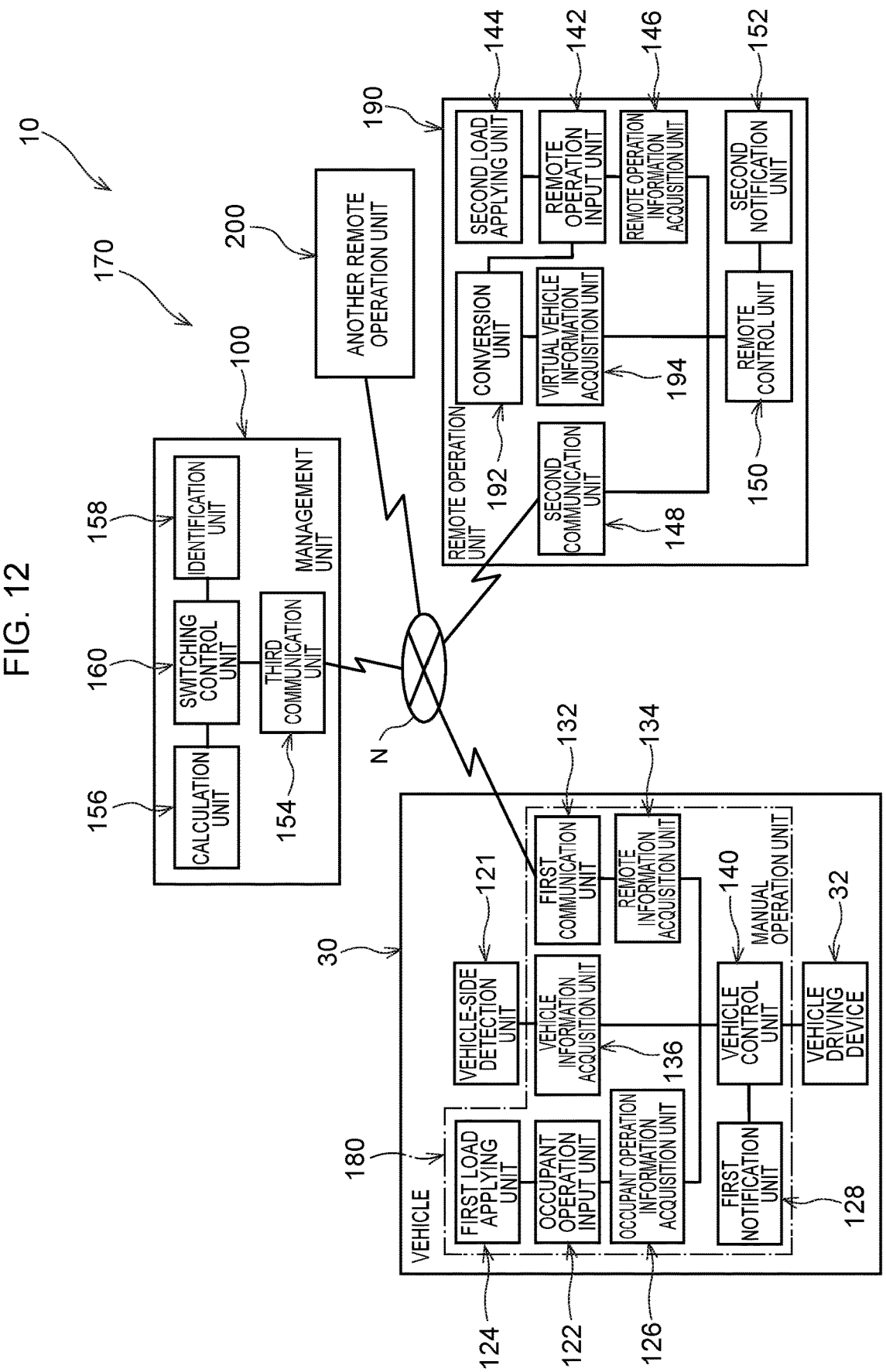
FIG. 12 is a block diagram showing a functional configuration of each component of the driving operation handover system according to a second embodiment.

FIG. 12 illustrates a functional configuration of a driving operation handover system 170 according to the second embodiment. The driving operation handover system 170 is different from the first exemplary embodiment in that, in the driving operation handover system 20 shown in FIG. 5, the information acquired by the vehicle information acquisition unit 136 is different, and that the conversion unit 192 and the virtual vehicle information acquisition unit 194 are added. The manual operation unit 180 and the remote operation unit 190 are distinguished from the manual operation unit 40 and the remote operation unit 70 of the first embodiment.

Figure 13:
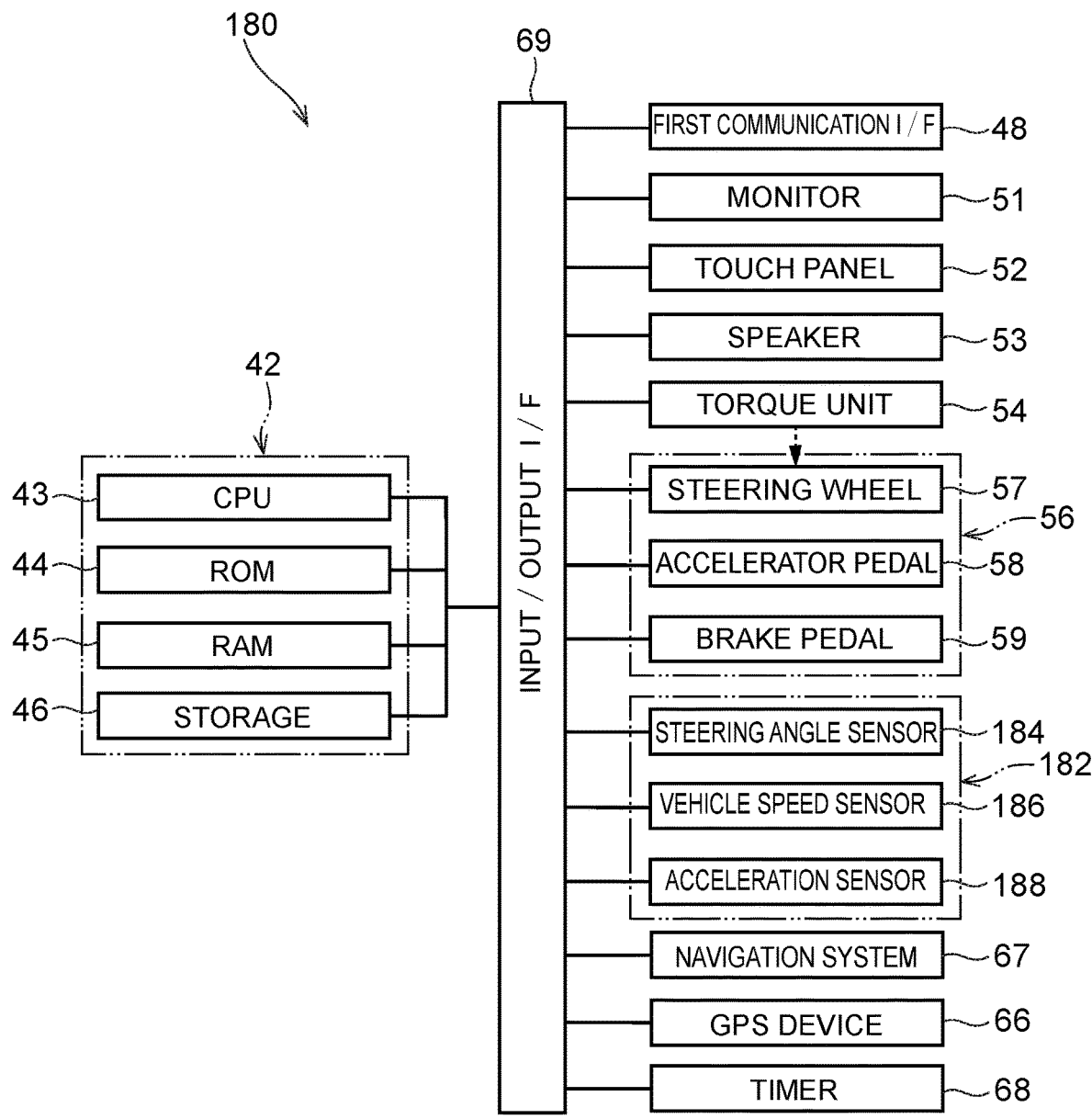
FIG. 13 is a block diagram showing a hardware configuration of a manual operation unit of the driving operation handover system according to the second embodiment.

FIG. 13 illustrates an example of a hardware configuration of the manual operation unit 180. The manual operation unit 180 differs from the first embodiment in having a sensor unit 182 instead of the sensor unit 62 shown in FIG. 2.

The sensor unit 182 includes a steering angle sensor 184, a vehicle speed sensor 186, and an acceleration sensor 188. That is, the sensor unit 182 is configured to detect the characteristic value of the traveling state of the vehicle 30 as the detection value instead of the various operation amounts of the occupant operation input unit 122 illustrated in FIG. 12. Examples of the characteristic value include a steering angle, a vehicle speed, and a vehicle acceleration. Here, the vehicle speed will be described as an example of the setting characteristic, and the description of the steering angle and the acceleration will be omitted.

The steering angle sensor 184 detects an angle between a center axis (not shown) extending in the vehicle front-rear direction and passing through the center of the vehicle 30 in the vehicle width direction, and the center line of the steered wheel. Vehicle speed sensor 186 detects the traveling speed of vehicle 30. The acceleration sensor 188 detects the acceleration applied to the vehicle 30. Known sensors are used for the steering angle sensor 184, the vehicle speed sensor 186, and the acceleration sensor 188, respectively.

The vehicle-side detection unit 121 illustrated in FIG. 12 is an example of a detection unit. The vehicle-side detection unit 121 is configured to include a sensor unit 182 shown in FIG. 13 and detects a characteristic value of the traveling state of the vehicle 30 as a detection value. The first characteristic value A in the second embodiment is a vehicle speed as an example among detection values detected by the vehicle-side detection unit 121, for example, a steering angle, a vehicle speed, an acceleration, and the like. In the second embodiment, the vehicle information acquisition unit 136 is an example of the first acquisition unit and the manual acquisition unit instead of the occupant operation information acquisition unit 126.

The conversion unit 192 is provided in the remote operation unit 190. Further, the conversion unit 192 converts the operation amount of the remote operation unit 190 operated by the remote operator PB, for example, the depression amount of the accelerator pedal 88, into a virtual value representing the traveling state of the virtual vehicle C, for example, to the vehicle speed.

The virtual vehicle information acquisition unit 194 is provided in the remote operation unit 190. The virtual vehicle information acquisition unit 194 acquires the information on the vehicle speed converted by the conversion unit 192 as an example of the second characteristic value B while the virtual vehicle C illustrated in FIG. 7 is traveling. That is, the second characteristic value B is a virtual value converted by the conversion unit 192. The description of the other operation amounts will be omitted. In addition, the virtual vehicle information acquisition unit 194 transmits the acquired information on the acquired vehicle speed to the remote control unit 150. The remote control unit 150 transmits the received vehicle speed information to the management unit 100.

Operation and Advantageous Effects

Explanation follows regarding operation of the driving operation handover system 170 of the second exemplary embodiment. The description of the same operation and the same program processing as those of the driving operation handover system 20 of the first embodiment shown in FIG. 1 will be omitted. In addition, for each configuration in the driving operation handover system 170, refer to FIG. 12 and FIG. 13, and the description of individual figure numbers is omitted.

In the driving operation handover system 170, the first characteristic value A and the second characteristic value B in step S16 shown in FIG. 9, step S46 shown in FIG. 10, step S74 and step S76 shown in FIG. 11, are replaced with the characteristic values relating to the traveling state of the vehicle 30 and the virtual vehicle C.

Here, in the driving operation handover system 170, a difference value ΔDA (not shown) relating to the vehicle state of the vehicle 30 is used for comparison with the set threshold value K shown in FIG. 8 instead of the difference value ΔD based on the operation amounts of the manual operation unit 180 and the remote operation unit 190. As a result, the characteristic value of the state of the vehicle 30 is directly used, that is, an error when the operation amount of the manual operation unit 180 is converted into the characteristic value of the vehicle state is not included, and, therefore, the error included in the difference value ΔDA can be reduced compared to the configuration using operation amounts.

Note that the present disclosure is not limited to the above exemplary embodiments.

In the driving operation handover systems 20 and 170, the identification unit 158 may not be provided. That is, the manual operation and the remote operation may be switched based on the difference value ΔD regardless of the traveling section S of the vehicle 30. Further, in the driving operation handover systems 20 and 170, when the difference value ΔD does not become smaller than the set threshold K, the switching control unit 160 does not have to notify that the driving operation is not switched.

Further, in the driving operation handover systems 20, 170, another remote operation unit 200 may not be provided. In addition, the number of the other remote operation units 200 is not limited to one, and may be two or more. The occupant PA may select from among the plurality of other remote operation units 200. In the driving operation handover systems 20 and 170, the first load applying unit 124 and the second load applying unit 144 may not be provided.

Among the setting characteristics, the one related to the operation amount is not limited to the accelerator opening amount, and may be the depression amount of the brake pedal or the rotation amount of the steering wheel. Further, among the set characteristics, those relating to the states of the vehicle 30 and the virtual vehicle C are not limited to the vehicle speed, and may be steering angles and accelerations. The load application unit is not limited to one that applies a torque to the steering wheel 57 and the steering wheel 87, and may be one that applies a reaction force to the depression of each pedal.

In the first and second embodiments, the case where the manual operation is switched to the remote operation has been described. However, similar processing can be performed based on the difference value ΔD even when the occupant PA requests a manual operation during the remote operation by the remote operation units 70 and 190 and is switched from the remote operation to the manual operation.

The non-switchable section S2 is not limited to the section where the traveling path R is curved, and may be set based on the magnitude of the inclination angle of the traveling path R with respect to the horizontal plane. The non-switchable section S2 may be set based on the width of the traveling path R. The notification of the information to the occupant PA and the remote operator PB is not limited to the notification method by display on the monitors 51 and 79, but may be a notification method by sound output from the speakers 53 and 83.

In the above embodiments, various processors other than the CPU may execute the driving operation handover process in which the CPU reads and executes software, for example, a software program. Examples of such processors include a PLD, that is a Programmable Logic Device, in which circuit configuration can be modified post-manufacture, such as a FPGA, that is, a Field-Programmable Gate Array, or a specialized electric circuit that is a processor with a specifically-designed circuit configuration for executing specific processing, such as an ASIC, that is an Application Specific Integrated Circuit. Further, the above-described processings may be executed by one of these various types of processors, or may be executed by combining two or more of the same type or different types of processors, for example, plurals FPGAs, or a combination of a CPU and an FPGA, or the like. More specific examples of hardware structures of such processors include electric circuits configured by combining circuit elements such as semiconductor devices.

Further, in the above-described embodiment, although aspect in which the driving operation handover processing program is stored, for example, installed, in advance in the ROM or the storage is explained, it is not limited to this. The program may be provided in a format recorded on a non-transitory recording medium such as a CD-ROM, that is, a Compact Disk Read Only Memory, a DVD-ROM, that is, a Digital Versatile Disk Read Only Memory, or a USB, that is, a Universal Serial Bus memory. The driving operation handover processing programs may alternatively be provided in a format that can be downloaded from an external device through a network N.

What is claimed is:

1. A driving operation handover system used with a vehicle that is configured to be switched between operation of the vehicle manually by an occupant of the vehicle and operation of the vehicle remotely by a remote operator who is not within the vehicle, the system comprising:
   a memory; and
   a processor,
   wherein the processor is configured to:
   receive, during traveling of the vehicle, a request to switch between the operation of the vehicle manually by the occupant of the vehicle and the operation of the vehicle remotely by the remote operator, the request being received after time has passed from a starting time of the traveling of the vehicle, and the request being caused as a result of the occupant requesting the switch through an input device of the vehicle while the vehicle is traveling after the starting time;
   acquire a first characteristic value of preset setting characteristics during the traveling of the vehicle, which is equipped with a manual operation unit that the occupant of the vehicle operates, the processor acquiring the first characteristic value within a predetermined set time period after receiving the request to switch;
   acquire a second characteristic value of the preset setting characteristics within the predetermined set time period during traveling of a virtual vehicle that simulates the vehicle, which the remote operator operates using a remote operation unit;
   calculate a difference value between the first characteristic value and the second characteristic value;
   in a case in which the difference value is lower than a setting threshold value within the predetermined set time period, notify the occupant and the remote operator that operation of the vehicle can be handed over;
   after notification, switch the operation of the vehicle from one of the remote operator or the occupant to another of the remote operator or the occupant;
   instruct a first load application unit, which is provided at the manual operation unit and which applies a first load to an occupant-actuated operating member of the manual operation unit after the manual operation unit hands over the operation to the remote operation unit, to (i) apply the first load after the manual operation unit hands over the operation to the remote operation unit and (ii) release the first load after the remote operation unit hands over the operation to the manual operation unit; and
   instruct a second load application unit, which is provided at the remote operation unit and which applies a second load to a remote operator-actuated operating member of the remote operation unit after the remote operation unit hands over the operation to the manual operation unit, to (a) apply the second load after the remote operation unit hands over the operation to the manual operation unit and (b) release the second load after the manual operation unit hands over the operation to the remote operation unit.

2. The driving operation handover system according to claim 1, wherein:
   the first characteristic value is an operation amount of the manual operation unit operated by the occupant; and
   the second characteristic value is an operation amount of the remote operation unit operated by the remote operator.

3. The driving operation handover system according to claim 1, wherein:
   a detection unit that detects a characteristic value of a travel state of the vehicle, as a detection value, is provided at the vehicle;
   a conversion unit, which converts an operation amount of the remote operation unit operated by the remote operator to a virtual value indicating a travel state of the virtual vehicle, is provided at the remote operation unit;
   the first characteristic value is the detection value that is detected at the detection unit; and
   the second characteristic value is the virtual value that is converted at the conversion unit.

4. The driving operation handover system according to claim 1, wherein the processor is configured to:
   identify whether a section of travel of the vehicle is a switchable section in which switching is possible or a non-switchable section in which switching is not possible; and
   in a case in which the section of travel is identified as the non-switchable section, not execute switching the operation even if the difference value is lower than the setting threshold value.

5. The driving operation handover system according to claim 1, wherein the processor is configured to:
   not execute switching the operation in a case in which the difference value does not become lower than the setting threshold value within the predetermined set time period; and
   notify the occupant and the remote operator that the operation is not switched.

6. The driving operation handover system according to claim 5, wherein:
   a plurality of remote operation units are provided; and
   in a case in which the difference value does not become lower than the setting threshold value within the predetermined set time period, the processor issues a recommendation to the occupant to change to another of the plurality of remote operation units.

7. A vehicle that is configured to be switched between operation of the vehicle manually by an occupant of the vehicle and operation of the vehicle remotely by a remote operator who is not within the vehicle, the vehicle comprising:
   a memory;
   a processor;
   a manual operation unit at which operation is performed by the occupant of the vehicle;
   a manual acquisition unit that is provided at the manual operation unit; and a notification unit that is provided at the manual operation unit, wherein the processor is configured to:

receive, during traveling of the vehicle, a request to switch between the operation of the vehicle manually by the occupant of the vehicle and the operation of the vehicle remotely by the remote operator, the request being received after time has passed from a starting time of the traveling of the vehicle, and the request being caused as a result of the occupant requesting the switch through an input device of the vehicle while the vehicle is traveling after the starting time;

acquire a first characteristic value of preset setting characteristics during the traveling of the vehicle, the processor acquiring the first characteristic value within a predetermined set time period after receiving the request to switch;

in a case in which a difference value between the first characteristic value and a second characteristic value of the preset setting characteristics, which is acquired within the predetermined set time period during traveling of a virtual vehicle that simulates the vehicle and that is operated by the remote operator at a remote operation unit, is lower than a setting threshold value within the predetermined set time period, cause the notification unit to notify the occupant that the operation can be handed over;

after notification by the notification unit, cause a switching unit to switch the operation of the vehicle from one of the remote operator or the occupant to another of the remote operator or the occupant; and instruct a first load application unit, which is provided at the manual operation unit and which applies a first load to an occupant-actuated operating member of the manual operation unit after the manual operation unit hands over the operation to the remote operation unit, to (i) apply the first load after the manual operation unit hands over the operation to the remote operation unit and (ii) release the first load after the remote operation unit hands over the operation to the manual operation unit.

8. A driving operation handover method performed by a processor and used with a vehicle that is configured to be switched between operation of the vehicle manually by an occupant of the vehicle and operation of the vehicle remotely by a remote operator who is not within the vehicle, the method comprising:

receiving, during traveling of the vehicle, a request to switch between the operation of the vehicle manually by the occupant of the vehicle and the operation of the vehicle remotely by the remote operator, the request being received after time has passed from a starting time of the traveling of the vehicle, and the request being caused as a result of the occupant requesting the switch through an input device of the vehicle while the vehicle is traveling after the starting time;

acquiring a first characteristic value of preset setting characteristics during the traveling of the vehicle, which is equipped with a manual operation unit that the occupant of the vehicle operates, the first characteristic value being acquired within a predetermined set time period after receiving the request to switch;

acquiring a second characteristic value of the preset setting characteristics within the predetermined set time period during traveling of a virtual vehicle that simulates the vehicle, which the remote operator operates using a remote operation unit;

calculating a difference value between the first characteristic value and the second characteristic value;

in a case in which the difference value is lower than a setting threshold value within the predetermined set time period, notifying the occupant and the remote operator that operation of the vehicle can be handed over;

after notification, switching the operation of the vehicle from one of the remote operator or the occupant to another of the remote operator or the occupant;

instructing a first load application unit, which is provided at the manual operation unit and which applies a first load to an occupant-actuated operating member of the manual operation unit after the manual operation unit hands over the operation to the remote operation unit, to (i) apply the first load after the manual operation unit hands over the operation to the remote operation unit and (ii) release the first load after the remote operation unit hands over the operation to the manual operation unit; and instructing a second load application unit, which is provided at the remote operation unit and which applies a second load to a remote operator-actuated operating member of the remote operation unit after the remote operation unit hands over the operation to the manual operation unit, to (a) apply the second load after the remote operation unit hands over the operation to the manual operation unit and (b) release the second load after the manual operation unit hands over the operation to the remote operation unit.

9. The driving operation handover method according to claim 8, wherein:

the first characteristic value is an operation amount of the manual operation unit operated by the occupant; and the second characteristic value is an operation amount of the remote operation unit operated by the remote operator.

10. The driving operation handover method according to claim 8, wherein:

a detection unit that detects a characteristic value of a travel state of the vehicle, as a detection value, is provided at the vehicle;

a conversion unit, which converts an operation amount of the remote operation unit operated by the remote operator to a virtual value indicating a travel state of the virtual vehicle, is provided at the remote operation unit;

the first characteristic value is the detection value that is detected at the detection unit; and the second characteristic value is the virtual value that is converted at the conversion unit.

11. The driving operation handover method according to claim 8, further comprising, the processor:

identifying whether a section of travel of the vehicle is a switchable section in which switching is possible or a non-switchable section in which switching is not possible; and in a case in which the section of travel is identified as the non-switchable section, not executing switching the operation even if the difference value is lower than the setting threshold value.

12. The driving operation handover method according to claim 8, further comprising, the processor:

not executing switching the operation in a case in which the difference value does not become lower than the setting threshold value within the predetermined set time period; and notifying the occupant and the remote operator that the operation is not switched.

13. The driving operation handover method according to claim 12, further comprising, the processor:
in a case in which the difference value does not become lower than the setting threshold value within the predetermined set time period, issuing a recommendation to the occupant to change to another of a plurality of remote operation units.

14. A non-transitory storage medium that stores a program that is executable by a processor to perform driving operation handover processing used with a vehicle that is configured to be switched between operation of the vehicle manually by an occupant of the vehicle and operation of the vehicle remotely by a remote operator who is not within the vehicle, the processing comprising:
receiving, during traveling of the vehicle, a request to switch between the operation of the vehicle manually by the occupant of the vehicle and the operation of the vehicle remotely by the remote operator, the request being received after time has passed from a starting time of the traveling of the vehicle, and the request being caused as a result of the occupant requesting the switch through an input device of the vehicle while the vehicle is traveling after the starting time;
acquiring a first characteristic value of preset setting characteristics during the traveling of the vehicle, which is equipped with a manual operation unit that the occupant of the vehicle operates, the first characteristic value being acquired within a predetermined set time period after receiving the request to switch;
acquiring a second characteristic value of the preset setting characteristics within the predetermined set time period during traveling of a virtual vehicle that simulates the vehicle, which the remote operator operates using a remote operation unit;
calculating a difference value between the first characteristic value and the second characteristic value;
in a case in which the difference value is lower than a setting threshold value within the predetermined set time period, notifying the occupant and the remote operator that operation of the vehicle can be handed over;
after notification, switching the operation of the vehicle from one of the remote operator or the occupant to another of the remote operator or the occupant;
instructing a first load application unit, which is provided at the manual operation unit and which applies a first load to an occupant-actuated operating member of the manual operation unit after the manual operation unit hands over the operation to the remote operation unit, to (i) apply the first load after the manual operation unit hands over the operation to the remote operation unit and (ii) release the first load after the remote operation unit hands over the operation to the manual operation unit; and
instructing a second load application unit, which is provided at the remote operation unit and which applies a second load to a remote operator-actuated operating member of the remote operation unit after the remote operation unit hands over the operation to the manual operation unit, to (a) apply the second load after the remote operation unit hands over the operation to the manual operation unit and (b) release the second load after the manual operation unit hands over the operation to the remote operation unit.

15. The non-transitory storage medium according to claim 14, wherein:
the first characteristic value is an operation amount of the manual operation unit operated by the occupant; and
the second characteristic value is an operation amount of the remote operation unit operated by the remote operator.

16. The non-transitory storage medium according to claim 14, wherein:
a detection unit that detects a characteristic value of a travel state of the vehicle, as a detection value, is provided at the vehicle;
a conversion unit, which converts an operation amount of the remote operation unit operated by the remote operator to a virtual value indicating a travel state of the virtual vehicle, is provided at the remote operation unit;
the first characteristic value is the detection value that is detected at the detection unit; and
the second characteristic value is the virtual value that is converted at the conversion unit.

17. The non-transitory storage medium according to claim 14, wherein the processing further comprises:
identifying whether a section of travel of the vehicle is a switchable section in which switching is possible or a non-switchable section in which switching is not possible; and
in a case in which the section of travel is identified as the non-switchable section, not executing switching the operation even if the difference value is lower than the setting threshold value.

18. The non-transitory storage medium according to claim 14, wherein the processing further comprises:
not executing switching the operation in a case in which the difference value does not become lower than the setting threshold value within the predetermined set time period; and
notifying the occupant and the remote operator that the operation is not switched.

19. The non-transitory storage medium according to claim 18, wherein the processing further comprises:
in a case in which the difference value does not become lower than the setting threshold value within the predetermined set time period, issuing a recommendation to the occupant to change to another of a plurality of remote operation units.

* * * * *